United States Patent
Kitazato et al.

(10) Patent No.: US 11,265,606 B2
(45) Date of Patent: *Mar. 1, 2022

(54) RECEPTION APPARATUS, RECEPTION METHOD, AND PROGRAM

(71) Applicant: SATURN LICENSING, LLC., New York, NY (US)

(72) Inventors: Naohisa Kitazato, Tokyo (JP); Yoshiharu Dewa, Tokyo (JP)

(73) Assignee: SATURN LICENSING, LLC, New York, NY (US)

( * ) Notice: Subject to any disclaimer, the term of this patent is extended or adjusted under 35 U.S.C. 154(b) by 237 days.

This patent is subject to a terminal disclaimer.

(21) Appl. No.: 14/735,879

(22) Filed: Jun. 10, 2015

(65) Prior Publication Data

US 2015/0281781 A1 Oct. 1, 2015

Related U.S. Application Data

(63) Continuation of application No. 13/238,080, filed on Sep. 21, 2011, now Pat. No. 9,078,031.
(Continued)

(51) Int. Cl.
*H04N 21/462* (2011.01)
*H04N 21/236* (2011.01)
(Continued)

(52) U.S. Cl.
CPC ...... *H04N 21/4622* (2013.01); *H04H 20/106* (2013.01); *H04N 21/23614* (2013.01);
(Continued)

(58) Field of Classification Search
CPC .......................... H04N 21/43; H04N 21/4307
(Continued)

(56) References Cited

U.S. PATENT DOCUMENTS 7,584,491 B2 * 9/2009 Bruckner ........... H04N 7/17318
 709/213
8,595,783 B2 11/2013 Dewa
(Continued)

FOREIGN PATENT DOCUMENTS

EP 1 389 020 A1 2/2004
EP 2 084 908 B1 7/2010
(Continued)

OTHER PUBLICATIONS

The Extended European Search Report dated Oct. 1, 2004, in Application No. / Patent No. 12800685.5—1907 / 2723068.
(Continued)

*Primary Examiner* — John W Miller
*Assistant Examiner* — Justin B Sanders
(74) *Attorney, Agent, or Firm* — Oblon, McClelland, Maier & Neustadt, L.L.P.

(57) ABSTRACT

Disclosed herein is a reception apparatus including: a reception block configured to receive broadcast content broadcast via a broadcasting network; an acquisition block configured to acquire inserted content that is inserted in the broadcast content during the reception thereof; an output block configured to output at least one of the broadcast content and the inserted content; a switch block configured to switch between the broadcast content and the inserted content outputted from the output block; and a buffer configured to sequentially store data of the received broadcast content when the broadcast content is switched to the inserted content; wherein, if the inserted content is switched to the broadcast content, the output block outputs the broadcast content from the buffer while the inserted content is outputted.

21 Claims, 19 Drawing Sheets

Related U.S. Application Data

(60) Provisional application No. 61/493,145, filed on Jun. 3, 2011, provisional application No. 61/388,999, filed on Oct. 1, 2010.

(51) Int. Cl.

| | | |
|---|---|---|
| *H04N 21/433* | (2011.01) | |
| *H04N 21/434* | (2011.01) | |
| *H04N 21/44* | (2011.01) | |
| *H04N 21/858* | (2011.01) | |
| *H04H 20/10* | (2008.01) | |
| *H04N 21/43* | (2011.01) | |
| *H04N 21/435* | (2011.01) | |
| *H04N 21/81* | (2011.01) | |
| *H04N 21/845* | (2011.01) | |

(52) U.S. Cl.
CPC ........ *H04N 21/435* (2013.01); *H04N 21/4307* (2013.01); *H04N 21/4331* (2013.01); *H04N 21/4341* (2013.01); *H04N 21/44004* (2013.01); *H04N 21/44016* (2013.01); *H04N 21/8173* (2013.01); *H04N 21/8453* (2013.01); *H04N 21/858* (2013.01)

(58) Field of Classification Search
USPC .......................................................... 725/14
See application file for complete search history.

(56) References Cited

U.S. PATENT DOCUMENTS

| | | | |
|---|---|---|---|
| 8,705,933 | B2 | 4/2014 | Eyer |
| 8,839,338 | B2 | 9/2014 | Eyer |
| 8,842,974 | B2 | 9/2014 | Kitazato |
| 8,863,171 | B2 | 10/2014 | Blanchard et al. |
| 8,872,888 | B2 | 10/2014 | Kitazato |
| 8,875,169 | B2 | 10/2014 | Yamagishi |
| 8,875,204 | B2 | 10/2014 | Kitazato |
| 8,884,800 | B1 | 11/2014 | Fay |
| 8,886,009 | B2 | 11/2014 | Eyer |
| 8,892,636 | B2 | 11/2014 | Yamagishi |
| 8,893,210 | B2 | 11/2014 | Eyer |
| 8,896,755 | B2 | 11/2014 | Kitazato et al. |
| 8,898,720 | B2 | 11/2014 | Eyer |
| 8,898,723 | B2 | 11/2014 | Eyer |
| 8,904,417 | B2 | 12/2014 | Kitahara et al. |
| 8,908,103 | B2 | 12/2014 | Kitazato |
| 8,909,694 | B2 | 12/2014 | Yamagishi et al. |
| 8,914,832 | B2 | 12/2014 | Yamagishi |
| 8,917,358 | B2 | 12/2014 | Eyer |
| 8,918,801 | B2 | 12/2014 | Kitazato et al. |
| 8,925,016 | B2 | 12/2014 | Eyer |
| 8,930,988 | B2 | 1/2015 | Kitazato et al. |
| 8,938,756 | B2 | 1/2015 | Kitazato |
| 8,941,779 | B2 | 1/2015 | Eyer |
| 8,966,564 | B2 | 2/2015 | Kitazato |
| 8,988,612 | B2 | 3/2015 | Kitazato |
| 9,015,785 | B2 | 4/2015 | Yamagishi |
| 9,038,095 | B2 | 5/2015 | Fay et al. |
| 9,043,857 | B2 | 5/2015 | Dewa |
| 2003/0033157 | A1 | 2/2003 | Dempski et al. |
| 2003/0037068 | A1 | 2/2003 | Thomas et al. |
| 2003/0086003 | A1 | 5/2003 | Koga |
| 2004/0031058 | A1 | 2/2004 | Reisman |
| 2004/0107449 | A1* | 6/2004 | Fukuda .............. H04N 5/44543 |
| | | | 725/135 |
| 2004/0260827 | A1 | 12/2004 | Wang |
| 2006/0194535 | A1 | 8/2006 | Houldsworth et al. |
| 2006/0242692 | A1 | 10/2006 | Thione et al. |
| 2007/0169164 | A1 | 7/2007 | Marilly et al. |
| 2008/0028074 | A1 | 1/2008 | Ludvig |
| 2008/0079754 | A1 | 4/2008 | Kuroki |
| 2008/0086570 | A1* | 4/2008 | Dey .................. H04N 21/2402 |
| | | | 709/231 |
| 2008/0109556 | A1* | 5/2008 | Karlberg .............. H04N 7/163 |
| | | | 709/231 |
| 2008/0111699 | A1* | 5/2008 | Kwon .................. G08B 27/008 |
| | | | 340/601 |
| 2008/0120638 | A1 | 5/2008 | King et al. |
| 2008/0247543 | A1 | 10/2008 | Mick et al. |
| 2009/0087161 | A1 | 4/2009 | Roberts et al. |
| 2009/0125946 | A1 | 5/2009 | Fukuda |
| 2009/0300692 | A1 | 12/2009 | Mavlankar et al. |
| 2009/0313663 | A1 | 12/2009 | Kitazato et al. |
| 2009/0320064 | A1 | 12/2009 | Soldan et al. |
| 2009/0320081 | A1 | 12/2009 | Chui et al. |
| 2010/0122282 | A1* | 5/2010 | DuBose ............. H04N 21/6543 |
| | | | 725/32 |
| 2010/0146078 | A1* | 6/2010 | Wolff .................. H04L 12/1822 |
| | | | 709/219 |
| 2010/0205628 | A1 | 8/2010 | Davis et al. |
| 2010/0299715 | A1* | 11/2010 | Slothouber ........ H04N 21/4438 |
| | | | 725/118 |
| 2011/0078023 | A1* | 3/2011 | Aldrey ............... G06Q 30/0257 |
| | | | 705/14.55 |
| 2011/0088075 | A1 | 4/2011 | Eyer |
| 2011/0243536 | A1 | 10/2011 | Eyer |
| 2011/0246488 | A1 | 10/2011 | Eyer |
| 2011/0247028 | A1 | 10/2011 | Eyer |
| 2011/0298981 | A1 | 12/2011 | Eyer |
| 2011/0299827 | A1 | 12/2011 | Eyer |
| 2011/0302599 | A1 | 12/2011 | Eyer |
| 2011/0302611 | A1 | 12/2011 | Eyer |
| 2012/0044418 | A1* | 2/2012 | Eyer ...................... H04N 21/00 |
| | | | 348/462 |
| 2012/0047531 | A1 | 2/2012 | Eyer |
| 2012/0050619 | A1 | 3/2012 | Kitazato et al. |
| 2012/0054214 | A1 | 3/2012 | Yamagishi et al. |
| 2012/0054235 | A1 | 3/2012 | Kitazato et al. |
| 2012/0054268 | A1 | 3/2012 | Yamagishi |
| 2012/0060197 | A1 | 3/2012 | Kitahara et al. |
| 2012/0063508 | A1 | 3/2012 | Hattori et al. |
| 2012/0072956 | A1 | 3/2012 | Thomas et al. |
| 2012/0072965 | A1 | 3/2012 | Dewa |
| 2012/0081607 | A1 | 4/2012 | Kitazato |
| 2012/0082266 | A1 | 4/2012 | Kitazato et al. |
| 2012/0084802 | A1 | 4/2012 | Kitazato |
| 2012/0185888 | A1 | 7/2012 | Eyer et al. |
| 2012/0253826 | A1 | 10/2012 | Kitazato et al. |
| 2013/0024894 | A1 | 1/2013 | Eyer |
| 2013/0036440 | A1 | 2/2013 | Eyer |
| 2013/0055313 | A1 | 2/2013 | Eyer |
| 2013/0103716 | A1 | 4/2013 | Yamagishi |
| 2013/0191860 | A1 | 7/2013 | Kitazato et al. |
| 2013/0201399 | A1 | 8/2013 | Kitazato et al. |
| 2013/0205327 | A1 | 8/2013 | Eyer |
| 2013/0212634 | A1 | 8/2013 | Kitazato |
| 2013/0254824 | A1 | 9/2013 | Eyer |
| 2013/0282870 | A1 | 10/2013 | Dewa et al. |
| 2013/0283311 | A1 | 10/2013 | Eyer |
| 2013/0283328 | A1 | 10/2013 | Kitazato |
| 2013/0291022 | A1 | 10/2013 | Eyer |
| 2013/0340007 | A1 | 12/2013 | Eyer |
| 2014/0013347 | A1 | 1/2014 | Yamagishi |
| 2014/0013379 | A1 | 1/2014 | Kitazato et al. |
| 2014/0040965 | A1 | 2/2014 | Kitazato et al. |
| 2014/0040968 | A1 | 2/2014 | Kitazato et al. |
| 2014/0043540 | A1 | 2/2014 | Kitazato et al. |
| 2014/0053174 | A1 | 2/2014 | Eyer et al. |
| 2014/0067922 | A1 | 3/2014 | Yamagishi et al. |
| 2014/0099078 | A1 | 4/2014 | Kitahara et al. |
| 2014/0122528 | A1 | 5/2014 | Yamagishi |
| 2014/0137153 | A1 | 5/2014 | Fay et al. |
| 2014/0137165 | A1 | 5/2014 | Yamagishi |
| 2014/0150040 | A1 | 5/2014 | Kitahara et al. |
| 2014/0157304 | A1 | 6/2014 | Fay et al. |
| 2014/0186008 | A1 | 7/2014 | Eyer |
| 2014/0208375 | A1 | 7/2014 | Fay et al. |
| 2014/0208380 | A1 | 7/2014 | Fay et al. |
| 2014/0229580 | A1 | 8/2014 | Yamagishi |
| 2014/0229979 | A1 | 8/2014 | Kitazato et al. |
| 2014/0253683 | A1 | 9/2014 | Eyer et al. |
| 2014/0327825 | A1 | 11/2014 | Eyer |

(56) References Cited

U.S. PATENT DOCUMENTS

| | | |
|---|---|---|
| 2014/0348448 A1 | 11/2014 | Eyer |
| 2014/0351877 A1 | 11/2014 | Eyer |
| 2014/0354890 A1 | 12/2014 | Eyer |
| 2015/0007215 A1 | 1/2015 | Fay et al. |
| 2015/0007219 A1 | 1/2015 | Blanchard et al. |
| 2015/0007242 A1 | 1/2015 | Fay |
| 2015/0012588 A1 | 1/2015 | Yamagishi |
| 2015/0012955 A1 | 1/2015 | Kitazato |
| 2015/0020146 A1 | 1/2015 | Eyer |
| 2015/0026730 A1 | 1/2015 | Eyer |
| 2015/0026739 A1 | 1/2015 | Kitazato |
| 2015/0033280 A1 | 1/2015 | Fay |
| 2015/0038100 A1 | 2/2015 | Fay |
| 2015/0046937 A1 | 2/2015 | Kitazato et al. |
| 2015/0046942 A1 | 2/2015 | Eyer |
| 2015/0058410 A1 | 2/2015 | Yamagishi et al. |
| 2015/0058875 A1 | 2/2015 | Kitahara et al. |
| 2015/0058906 A1 | 2/2015 | Kitazato et al. |
| 2015/0058911 A1 | 2/2015 | Kitazato et al. |
| 2015/0062428 A1 | 3/2015 | Eyer |
| 2015/0067713 A1 | 3/2015 | Yamagishi |
| 2015/0074704 A1 | 3/2015 | Kitazato |
| 2015/0082367 A1 | 3/2015 | Kitazato |

FOREIGN PATENT DOCUMENTS

| | | |
|---|---|---|
| JP | 2003-9113 | 1/2003 |
| JP | 2003-9113 A | 1/2003 |
| JP | 2003-18583 | 1/2003 |
| JP | 2003-18583 A | 1/2003 |
| JP | 2003-530033 A | 10/2003 |
| JP | 2003-590033 | 10/2003 |
| JP | 2005-500727 | 1/2005 |
| JP | 2006-50237 | 2/2006 |
| JP | 2006-245653 | 9/2006 |
| JP | 2006-311120 | 11/2006 |
| JP | 2007-116669 | 5/2007 |
| JP | 2007-251887 A | 9/2007 |
| JP | 2008-53916 | 3/2008 |
| JP | 2009-118343 | 5/2009 |
| JP | 2009-118343 A | 5/2009 |
| JP | 2010-288192 | 12/2010 |
| RU | 2 328 086 C2 | 6/2006 |
| WO | WO 2010/109860 A1 | 9/2010 |

OTHER PUBLICATIONS

Office Action dated Nov. 27, 2014 in Japanese Patent Application No. 2013-520530.
International Search Report dated Nov. 29, 2011, in Patent Application No. PCT/JP2011/071566 filed Sep. 22, 2011 (with English-language translation).
Extended European Search Report dated May 8, 2014, in European Patent Application No. 11828912.3.
Extended European Search Report dated May 12, 2014, in European Patent Application No. 11828914.9.
Extended European Search Report dated Feb. 6, 2014 in Patent Application No. 11828915.6.
Office Action dated Feb. 20, 2014 in Japanese Patent Application No. 2013-520530 with English-language translation.
Extended European Search Report dated Feb. 26, 2014 in Patent Application No. 11828910.7.
Extended European Search Report dated Mar. 6, 2014 in Patent Application No. 11828911.5.
Kentaro Yamazaki, "Open house 2011:Hybridcast", Conjunction with SNS and TV, http//av.watch.impress.co.jp/docs/news/20110524_448049.html; May 24, 2011, 6 pages.
International Search Report dated Jul. 17, 2012 in PCT/JP2012/064806 filed Jun. 8, 2012 (w/ English-language translation).
Kentaro Yamazaki, "Open House 2011. Linking the TV and the SNS Hybridcast", online URL:http://av.watch.impress.co.jp.docs/news/20110524_448049.html., May 24, 2011, pp. 1-6 plus cover page.
International Search Report dated Dec. 20, 2011, in PCT/JP2011/071567 filed Sep. 22, 2011 (with English translation).
International Search Report dated Dec. 20, 2011, in PCT/JP2011/071568 filed Sep. 22, 2011 (with English translation).
International Search Report dated Dec. 27, 2011, in PCT/JP2011/071569 filed Sep. 22, 2011 (with English translation).
International Search Report dated Dec. 27, 2011, in PCT/JP2011/071570 filed Sep. 22, 2011 (with English translation).
Hideaki Kimata, "Movement on MPEG 3DAV toward International Standardization of 3D Video", IPSJ SIG Technical Reports, vol. 2005, No. 23, 2005, 10 pages (with English abstract).
U.S. Appl. No. 13/216,375, filed Aug. 24, 2011, 2012-0063508, Hattori, et al.
U.S. Appl. No. 13/107,604, filed May 13, 2011, 2012-0072965, Dewa.
U.S. Appl. No. 13/238,080, filed Sep. 21, 2011, 2012-0082266, Kitazato, et al.
U.S. Appl. No. 13/220,231, filed Aug. 29, 2011, 2012-0060197, Kitahara, et al.
U.S. Appl. No. 13/038,939, filed Mar. 2, 2011, 2011-0302599, Eyer.
U.S. Appl. No. 12/985,241, filed Jan. 5, 2011, 2011-0243536, Eyer.
U.S. Appl. No. 13/039,005, filed Mar. 2, 2011, 2011-0299827, Eyer.
U.S. Appl. No. 13/071,560, filed Mar. 25, 2011, 2012-0054268, Yamagishi.
U.S. Appl. No. 13/075,440, filed Mar. 30, 2011, 2012-0054214, Yamagishi, et al.
U.S. Appl. No. 13/046,579, filed Mar. 11, 2011, 2011-0247028, Eyer.
U.S. Appl. No. 13/206,627, filed Aug. 10, 2011, 2012-0084802, Kitazato.
U.S. Appl. No. 13/238,065, filed Sep. 21, 2011, 2012-0081607, Kitazato.
U.S. Appl. No. 12/942,835, filed Nov. 9, 2010, 2011-0246488, Eyer.
U.S. Appl. No. 13/009,720, filed Jan. 19, 2011, 2012-0185888, Eyer, et al.
U.S. Appl. No. 13/080,866, filed Apr. 6, 2011, 2012-0054235, Kitazato, et al.
U.S. Appl. No. 13/071,551, filed Mar. 25, 2011, 2012-0050619, Kitazato, et al.
U.S. Appl. No. 12/798,118, filed Mar. 30, 2010, 2011-0088075, Eyer.
U.S. Appl. No. 13/038,984, filed Mar. 2, 2011, 2011-0298981, Eyer.
U.S. Appl. No. 13/038,967, filed Mar. 2, 2011, 2011-0302611, Eyer.
U.S. Appl. No. 13/422,203, filed Mar. 16, 2012, 2012-0253826, Kitazato, et al.
U.S. Appl. No. 13/562,946, filed Jul. 31, 2012, 2013-0055313, Eyer.
U.S. Appl. No. 13/559,166, filed Jul. 26, 2012, 2013-0036440, Eyer.
U.S. Appl. No. 13/490,216, filed Jun. 6, 2012, 2013-0024894, Eyer.
U.S. Appl. No. 13/587,975, filed Aug. 17, 2012, 2013-0212634, Kitazato.
U.S. Appl. No. 13/648,753, filed Oct. 10, 2012, 2013-0103716, Yamagishi.
U.S. Appl. No. 13/741,863, filed Jan. 15, 2013, 2013-0191860, Kitazato et al.
U.S. Appl. No. 13/753,591, filed Jan. 30, 2013, 2013-0201399, Kitazato et al.
U.S. Appl. No. 13/777,429, filed Feb. 26, 2013, 2014-0043540, Kitazato et al.
U.S. Appl. No. 13/777,693, filed Feb. 26, 2013, 2014-0040965, Kitazato et al.
U.S. Appl. No. 13/777,734, filed Feb. 26, 2013, 2014-0013379, Kitazato et al.
U.S. Appl. No. 13/782,694, filed Mar. 1, 2013, 2013-0254824, Eyer.
U.S. Appl. No. 13/782,730, filed Mar. 1, 2013, 2013-0283311, Eyer.
U.S. Appl. No. 13/841,343, filed Mar. 15, 2013, 2013-0205327, Eyer.
U.S. Appl. No. 13/846,282, filed Mar. 18, 2013, 2013-0282870, Dewa et al.
U.S. Appl. No. 13/846,247, filed Mar. 18, 2013, 2014-0040968, Kitazato et al.
U.S. Appl. No. 13/888,865, filed May 7, 2013, 2014-0099078, Kitahara et al.

(56) References Cited

OTHER PUBLICATIONS

U.S. Appl. No. 13/894,779, filed May 15, 2013, 2014-0122528, Yamagishi.
U.S. Appl. No. 13/905,721, filed May 30, 2013, 2014-0150040, Kitahara et al.
U.S. Appl. No. 13/915,664, filed Jun. 12, 2013, 2013-0340007, Eyer.
U.S. Appl. No. 13/930,814, filed Jun. 28, 2013, 2015-0007242, Fay.
U.S. Appl. No. 13/930,880, filed Jun. 28, 2013, 2015-0007215, Fay et al.
U.S. Appl. No. 13/924,907, filed Jun. 24, 2013, 2013-0291022, Eyer.
U.S. Appl. No. 13/997,844, filed Jun. 25, 2013, 2013-0283328, Kitazato.
U.S. Appl. No. 13/927,667, filed Jun. 26, 2013, 2014-0229580, Yamagishi.
U.S. Appl. No. 13/934,615, filed Jul. 3, 2013, 2014-0354890, Eyer.
U.S. Appl. No. 13/934,924, filed Jul. 3, 2013, 2014-0137165, Yamagishi.
U.S. Appl. No. 13/963,138, filed Aug. 9, 2013, 2014-0157304, Fay et al.
U.S. Appl. No. 13/963,111, filed Aug. 9, 2013, 2014-0137153, Fay et al.
U.S. Appl. No. 13/968,035, filed Aug. 15, 2013, 2014-0053174, Eyer et al.
U.S. Appl. No. 14/026,551, filed Sep. 13, 2013, 2014-0013347, Yamagishi.
U.S. Appl. No. 14/046,543, filed Oct. 4, 2013, 2014-0208380, Fay et al.
U.S. Appl. No. 14/046,566, filed Oct. 4, 2013, 2014-0208375, Fay et al.
U.S. Appl. No. 14/069,032, filed Oct. 31, 2013, 2014-0067922, Yamagishi et al.
U.S. Appl. No. 14/196,432, filed Mar. 4, 2014, 2014-0186008, Eyer.
U.S. Appl. No. 14/253,474, filed Apr. 15, 2014, 2014-0229979, Kitazato et al.
U.S. Appl. No. 14/275,231, filed May 12, 2014, 2014-0327825, Eyer.
U.S. Appl. No. 14/282,572, filed May 20, 2014, 2014-0253683, Eyer et al.
U.S. Appl. No. 14/295,695, filed Jun. 4, 2014, Eyer.
U.S. Appl. No. 14/457,290, filed Aug. 12, 2014, 2014-0348488, Eyer.
U.S. Appl. No. 14/458,310, filed Aug. 13, 2014, 2014-0351877, Eyer.
U.S. Appl. No. 14/490,263, filed Sep. 18, 2014, 2015-0007219, Blanchard et al.
U.S. Appl. No. 14/493,661, filed Sep. 23, 2014, 2015-0012588, Yamagishi.
U.S. Appl. No. 14/493,721, filed Sep. 23, 2014, 2015-0012955, Kitazato.
U.S. Appl. No. 14/504,455, filed Oct. 2, 2014, 2015-0038100, Fay.
U.S. Appl. No. 14/504,984, filed Oct. 2, 2014, 2015-0020146, Eyer.
U.S. Appl. No. 14/509,200, filed Oct. 8, 2014, 2015-0026730, Eyer.
U.S. Appl. No. 14/509,166, filed Oct. 8, 2014, 2015-0026739, Kitazato.
U.S. Appl. No. 14/512,761, filed Oct. 13, 2014, 2015-0033280, Fay.
U.S. Appl. No. 14/512,776, filed Oct. 13, 2014, 2015-0100997, Kitazato.
U.S. Appl. No. 14/521,034, filed Oct. 22, 2014, 2015-0046942, Eyer.
U.S. Appl. No. 14/529,440, filed Oct. 31, 2014, 2015-0058906, Kitazato et al.
U.S. Appl. No. 14/529,490, filed Oct. 31, 2014, 2015-0058410, Yamagishi et al.
U.S. Appl. No. 14/529,450, filed Oct. 31, 2014, 2015-0046937, Kitazato et al.
U.S. Appl. No. 14/529,421, filed Oct. 31, 2014, 2015-0058911, Kitazato et al.
U.S. Appl. No. 14/529,461, filed Oct. 31, 2014, 2015-0058875, Kitahara et al.
U.S. Appl. No. 14/538,311, filed Nov. 11, 2014, 2015-0062428, Eyer.
U.S. Appl. No. 14/538,083, filed Nov. 11, 2014, 2015-0067713, Yamagishi.
U.S. Appl. No. 14/543,231, filed Nov. 17, 2014, 2015-0074704, Kitazato.
U.S. Appl. No. 14/551,299, filed Nov. 24, 2014, 2015-0082367, Kitazato.
U.S. Appl. No. 14/566,574, filed Dec. 10, 2014, Fay.
U.S. Appl. No. 14/584,875, filed Dec. 29, 2014, Eyer.
U.S. Appl. No. 14/626,216, filed Feb. 19, 2015, Kitazato.
U.S. Appl. No. 14/659,245, filed Mar. 16, 2015, Yamagishi.
U.S. Appl. No. 14/680,752, filed Apr. 7, 2015, Eyer.
U.S. Appl. No. 14/686,277, filed Apr. 14, 2015, Fay et al.
Japanese Office Action dated Oct. 8, 2015 in Patent Application No. 2012-536381 (with English Translation).
Japanese Office Action dated Oct. 6, 2015 in Patent Application No. 2012-536380 (without English Translation).
Japanese Office Action dated Oct. 6, 2015 in Patent Application No. 2012-536379 (without English Translation).
Japanese Office Action dated Oct. 6, 2015 in Patent Application No. 2012-536378 (without English Translation).
Japanese Office Action dated Oct. 6, 2015 in Patent Application No. 2012-536377 (without English Translation)
Combined Office Action and Search Report dated May 6, 2015 in Chinese Patent Application No. 201180045979.9 (with English language translation).
Combined Office Action and Search Report dated May 22, 2015 in Chinese Patent Application No. 201180045985.4 (with English language translation).
Combined Office Action and Search Report dated Jun. 1, 2015 in Chinese Patent Application No. 201180045978.4 (with English language translation).
Office Action dated Jul. 22, 2013 in Mexican Patent Application No. MX/a/2013/003405.
Office Action dated Apr. 9, 2014 in Mexican Patent Application No. MX/a/2013/003405.
Office Action dated Jan. 15, 2015 in Mexican Patent Application No. MX/a/2013/003405.
Office Action dated May 10, 2016 in Japanese Patent Application No. 2012-536378.
Office Action dated Aug. 29, 2017 in Korean Patent Application No. 10-2013-7007117 (with English translation).
Office Action dated Jul. 14, 2017 in Canadian Patent Application No. 2,809,309.
Office Action dated Dec. 29, 2015 in Chinese Patent Application No. 201410283525.(with English translation only).
Office Action dated Jan. 13, 2016 in Chinese Patent Application No. 201180045979.9.
Office Action dated May 6, 2015 in Chinese Patent Application No. 201180045979.9 (with English translation).

\* cited by examiner

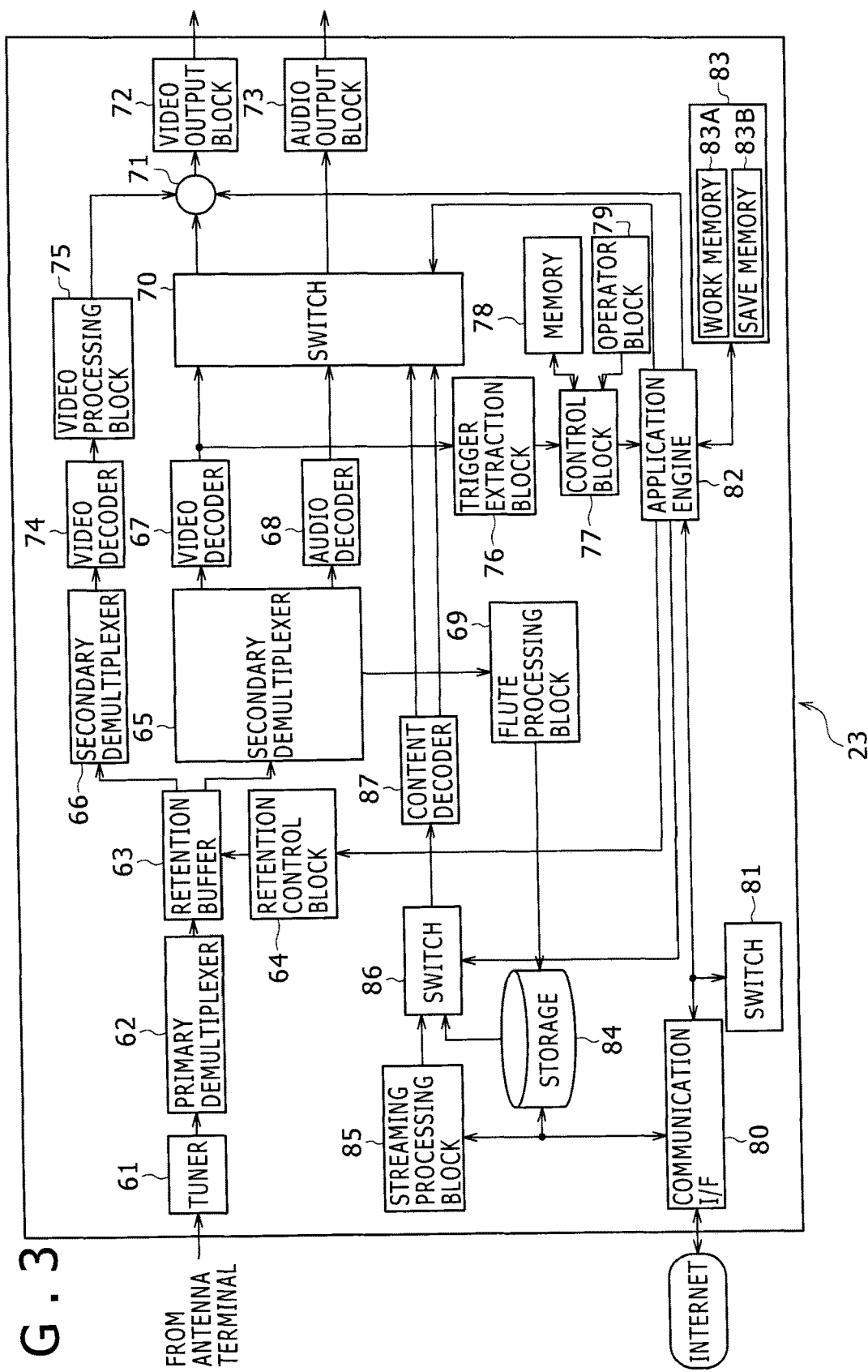

FIG. 4

TRIGGER WITH "Register" COMMAND

| Item | No of Bits | explanation |
|---|---|---|
| Trigger_id | 8 | IDENTIFYING TRIGGER INFORMATION OF THE SAME CONTENTS |
| Protocol_verion | 8 | FIXED TO 0 (PROTOCOL VERSION NUMBER) |
| Command_code | 8 | VALUE INDICATIVE OF A Register COMMAND |
| Trigger_validity | 8 | INFORMATION INDICATIVE OF PROBABILITY THAT TRIGGER INFORMATION BECOMES VALUE |
| App_id | N | APPLICATION ID (ALSO INDICATIVE OF THE URL OF APPLICATION ACQUISITION SOURCE) |
| App_type | 4 | APPLICATION PROTOCOL TYPE |
| App_life_scop | 1 | APPLICATION LIFE SCOPE |
| Persistent_priority | 2 | APPLICATION ACQUISITION AND PERSISTENT PRIORITY |
| Expire_date | 32 | EXPIRATION DATE |

FIG. 5

TRIGGER WITH "Execute" COMMAND

| Item | No of Bits | explanation |
|---|---|---|
| Trigger_id | 8 | IDENTIFYING TRIGGER INFORMATION OF THE SAME CONTENTS |
| Protocol_verion | 8 | FIXED TO 0 (PROTOCOL VERSION NUMBER) |
| Command_code | 8 | VALUE INDICATIVE OF AN Execute COMMAND |
| Trigger_validity | 8 | INFORMATION INDICATIVE OF PROBABILITY THAT TRIGGER INFORMATION BECOMES VALUE |
| App_id | N | APPLICATION ID (ALSO INDICATIVE OF THE URL OF APPLICATION ACQUISITION SOURCE) |
| App_type | 4 | APPLICATION PROTOCOL TYPE |
| App_life_scop | 1 | APPLICATION LIFE SCOPE |
| Persistent_priority | 2 | APPLICATION ACQUISITION AND PERSISTENT PRIORITY |
| Expire_date | 32 | EXPIRATION DATE |

FIG. 6

TRIGGER WITH "Inject_event" COMMAND

| Item | No of Bits | explanation |
|---|---|---|
| Trigger_id | 8 | IDENTIFYING TRIGGER INFORMATION OF THE SAME CONTENTS |
| Protocol_verion | 8 | FIXED TO 0 (PROTOCOL VERSION NUMBER) |
| Command_code | 8 | VALUE INDICATIVE OF AN Inject_event COMMAND |
| Trigger_validity | 8 | INFORMATION INDICATIVE OF PROBABILITY THAT TRIGGER INFORMATION BECOMES VALUE |
| App_id | N | APPLICATION ID (ALSO INDICATIVE OF THE URL OF APPLICATION ACQUISITION SOURCE) |
| Event_id | 8 | ID OF AN EVENT WRITTEN TO A SUBJECT APPLICATION |
| Event Embedded Data | M | DATA TO PASSED TO AN APPLICATION AT THE TIME OF EVENT FIRING |

FIG. 7

TRIGGER WITH "Suspend" COMMAND

| Item | No of Bits | explanation |
|---|---|---|
| Trigger_id | 8 | IDENTIFYING TRIGGER INFORMATION OF THE SAME CONTENTS |
| Protocol_verion | 8 | FIXED TO 0 (PROTOCOL VERSION NUMBER) |
| Command_code | 8 | VALUE INDICATIVE OF A Suspend COMMAND |
| Trigger_validity | 8 | INFORMATION INDICATIVE OF PROBABILITY THAT TRIGGER INFORMATION BECOMES VALUE |
| App_id | N | APPLICATION ID (ALSO INDICATIVE OF THE URL OF APPLICATION ACQUISITION SOURCE) |

FIG. 8

TRIGGER WITH "Terminate" COMMAND

| Item | No of Bits | explanation |
|---|---|---|
| Trigger_id | 8 | IDENTIFYING TRIGGER INFORMATION OF THE SAME CONTENTS |
| Protocol_verion | 8 | FIXED TO 0 (PROTOCOL VERSION NUMBER) |
| Command_code | 8 | VALUE INDICATIVE OF A Terminate COMMAND |
| Trigger_validity | 8 | INFORMATION INDICATIVE OF PROBABILITY THAT TRIGGER INFORMATION BECOMES VALUE |
| App_id | N | APPLICATION ID (ALSO INDICATIVE OF THE URL OF APPLICATION ACQUISITION SOURCE) |

FIG. 9

| Syntax | No. Bits | Format |
|---|---|---|
| Trigger_Info_data() { | | |
|   trigger_id | 8 | uimsbf |
|   protocol_version | 8 | uimsbf |
|   command_code | 8 | uimsbf" |
|   trigger_validity | 8 | uimsbf |
|   app_id_length | 8 | uimsbf |
|   for(i=0;i<N,i++) { | | |
|     app_id_byte | 8 | bslbsf |
|   } | | |
|   if(command_code==1 \|\| command_code==2) { | | (register/execute) |
|     app_type | 4 | uimsbf |
|     app_life_scope | 1 | uimsbf |
|     persistent_priority | 2 | Uimsbf |
|     reserved | 1 | |
|     app_expire_date | 32 | uimsbf |
|   } | | |
|   if(command_code==3) { | | (Inject event) |
|     event_id | 16 | uimsbf |
|     event_embedded_data_length | 8 | uimsbf |
|     for(i=0;i<N;i++) { | | |
|       event_embedded_data_byte | 8×N | bslbf |
|     } | | |
|   } | | |
|   if(coomand_code==4 \|\| coomand_code==5) { | | (suspend/terminate) |
|     reserved | 4 | "1111" |
|   } | | |
| } | | |

FIG.14

```
<object id="aaa" type="video/broadcast" style="visibility:visible;"></object>;
    // object ELEMENT FOR DISPLAYING BROADCASTING
<object id="bbb" type="video/mpeg" style="visibility:hidden;"></object>';
    // object ELEMENT FOR DISPLAYING VOD function change_stream(objId1,objId2){
int_bc_video = document.getElementById(objId1); // set broadcast object to var
int_vod_video = document.getElementById(objId2); // set vod object to var
int_bc_video.style = "visibility:hidden";
int_vod_video.style= "visibility:visible";   // BROADCAST -> SWITCHING FROM BROADCASTING TO VOD
} function change_stream(objId1,objId2){
int_bc_video = document.getElementById(objId1); // set broadcast object to var
int_vod_video = document.getElementById(objId2); // set vod object to var
int_bc_video.style = "visibility:visible";
int_vod_video.style = "visibility:hidden";   // VOD -> SWITCHING FROM VOD TO BROADCASTING
}
```

FIG.15

```
<object id="aaa" type="video/broadcast" style="visibility:visible;"></object>';
    // object ELEMENT FOR DISPLAYING BROADCASTING
<object id="bbb" type="video/mpeg" style="visibility:hidden;"></object>';
    // object ELEMENT FOR DISPLAYING VOD function change_stream(objId1,objId2){
    int_bc_video = document.getElementById(objId1);  // set broadcast object to var
    int_vod_video = document.getElementById(objId2); // set vod object to var
    int_bc_video.style = "visibility:hidden";
    int_vod_video.style= "visibility.visible"; // BROADCAST -> SWITCHING FROM BROADCASTING TO VOD
    retention_mode = true; // SETTING OF THE RETENTION MODE
} function change_stream(objId1,objId2){
    int_bc_video = document.getElementById(objId1);  // set broadcast object to var
    int_vod_video = document.getElementById(objId2); // set vod object to var
    int_bc_video.style = "visibility:visible";
    int_vod_video.style = "visibility:hidden", // VOD -> SWITCHING FROM VOD TO BROADCASTING
    retention_mode = false; // SETTING OF THE PASS-TROUGH MODE
}
```

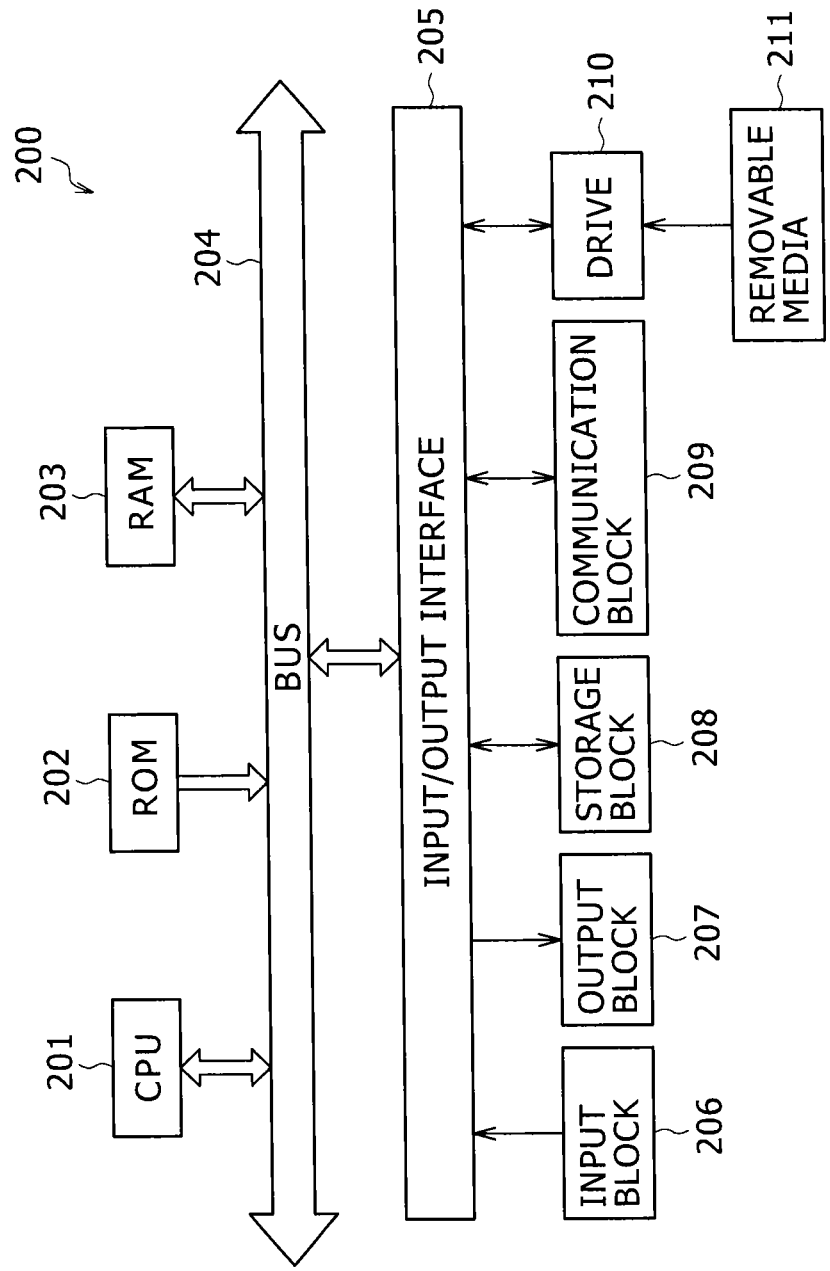

RECEPTION APPARATUS, RECEPTION METHOD, AND PROGRAM

CROSS-REFERENCE TO RELATED APPLICATION

This application is a continuation application of, and claims the benefit of priority under 35 U.S.C. §120 from, U.S. application Ser. No. 13/238,080, filed Sep. 21, 2011, herein incorporated by reference, which claims the benefit of priority of Provisional Application Serial Nos. 61/388,999, filed Oct. 1, 2010 and 61/493,145, filed Jun. 3, 2011, the entire contents of which is incorporated herein by reference.

BACKGROUND

The present disclosure relates to a reception apparatus, a reception method, and a program and, more particularly, to a reception apparatus, a reception method, and a program that are configured to provide high-quality services by the integration of broadcasting and communication.

Demands have been globally increasing for newly realizing sophisticated services through the integration of the communication means mainly providing individual on-demand services with the broadcasting that is multicasting media. Especially, the services which are customized to audience by use of the individuality of communication are required.

The technologies required for implementing the above-mentioned services have already been partially established to a certain extent and the standards for these services have been prepared, promoting the introduction thereof (refer to Japanese Patent Laid-open No. 2006-245653 for example).

SUMMARY

With services already in the introduction phase, viewing forms are assumed that web pages associated with broadcast services based on video and AV content based on streaming be viewed in parallel with the viewing of a broadcast program selected by the user, viewed separate from a broadcast program, or viewed after the viewing of a broadcast program.

In these viewing forms, services based on communication are nothing but additional services that are supplementary to broadcasting. On the other hand, for an integration of broadcasting and communication, a methodology is being examined in which broadcasting is switched to communication content customized as a part of a broadcast program. Currently, however, no technological scheme for specific service models based on such a methodology has not been established.

Therefore, the present disclosure addresses the above-identified and other problems associated with related-art methods and apparatuses and solves the addressed problems by providing quality services based on the integration of broadcasting and communication.

In carrying out the invention and according to one mode thereof, there is provided a reception apparatus. This reception apparatus has a reception block configured to receive broadcast content broadcast via a broadcasting network; an acquisition block configured to acquire inserted content that is inserted in the broadcast content during the reception thereof; an output block configured to output at least one of the broadcast content and the inserted content; a switch block configured to switch between the broadcast content and the inserted content outputted from the output block; and a buffer configured to sequentially store data of the received broadcast content when the broadcast content is switched to the inserted content. In this configuration, if the inserted content is switched to the broadcast content, the output block outputs the broadcast content from the buffer while the inserted content is outputted.

The above-mentioned reception apparatus further has a trigger extraction block configured to extract trigger information associated with control of an application program to be executed in cooperative association with the broadcast content, the trigger information being transmitted with the received broadcast content, wherein the acquisition block acquires the inserted content on the basis of the extracted trigger information.

In the above-mentioned reception apparatus, if the inserted content has been terminated, the switch block switches the inserted content to the broadcast content.

In the above-mentioned reception apparatus according, if the inserted content has been switched to the broadcast content, the output block outputs the received broadcast content.

In the above-mentioned reception apparatus, the inserted content is communication content that is acquired via a communication network and reproduced in a streaming manner.

In the above-mentioned reception apparatus, the inserted content is acquired via the broadcasting network in NRT (Non Real Time) broadcasting and stored.

In the above-mentioned reception apparatus, the inserted content is communication content that is acquired via a communication network and reproduced in a download manner.

In the above-mentioned reception apparatus, the trigger information includes at least one of an acquire command also called a register command, a startup command, an event fire command, a suspend command, and a terminate command for a predetermined application program.

The above-mentioned reception apparatus may be a stand-alone unit or a component block internal to one apparatus.

The reception method or a computer program of one mode of the present disclosure corresponds to the above-mentioned reception apparatus.

In the reception apparatus, the reception method, and the computer program according to one mode of the present disclosure, broadcast content broadcast via a broadcasting network is received, inserted content inserted in the broadcast content is obtained during the reception of the broadcast content, the broadcast content or the inserted content is outputted, the broadcast content outputted from the output source is switched to the inserted contented, the data of the received broadcast content is sequentially stored if broadcast content has been switched to the inserted content, and the stored broadcast content is outputted while the inserted content is outputted if the inserted content has been switched to the broadcast content.

As described and according to the embodiments of the present disclosure, services of high quality can be provided by the integration of broadcasting and communication.

BRIEF DESCRIPTION OF THE DRAWINGS

FIG. 3 is a diagram illustrating an exemplary configuration of a reception apparatus;

FIG. 4 is a diagram showing items included in trigger information of a register command;

FIG. 5 a diagram showing items included in trigger information of an execute command;

FIG. 6 is a diagram showing items included in trigger information of an inject event command;

FIG. 7 is a diagram showing items included in trigger information of a suspend command;

FIG. 8 is a diagram showing items included in trigger information of a terminate command;

FIG. 9 is a diagram showing an exemplary syntax of trigger information;

FIG. 14 is a diagram showing an exemplary description of an application of the pass-through mode;

FIG. 15 is a diagram showing an exemplary description of an application of the retention mode;

FIG. 19 is a diagram illustrating an exemplary configuration of a computer.

DETAILED DESCRIPTION OF THE PREFERRED EMBODIMENTS

This invention will be described in further detail by way of embodiments thereof with reference to the accompanying drawings.

—Exemplary Configuration of a Broadcasting System

Figure 1:
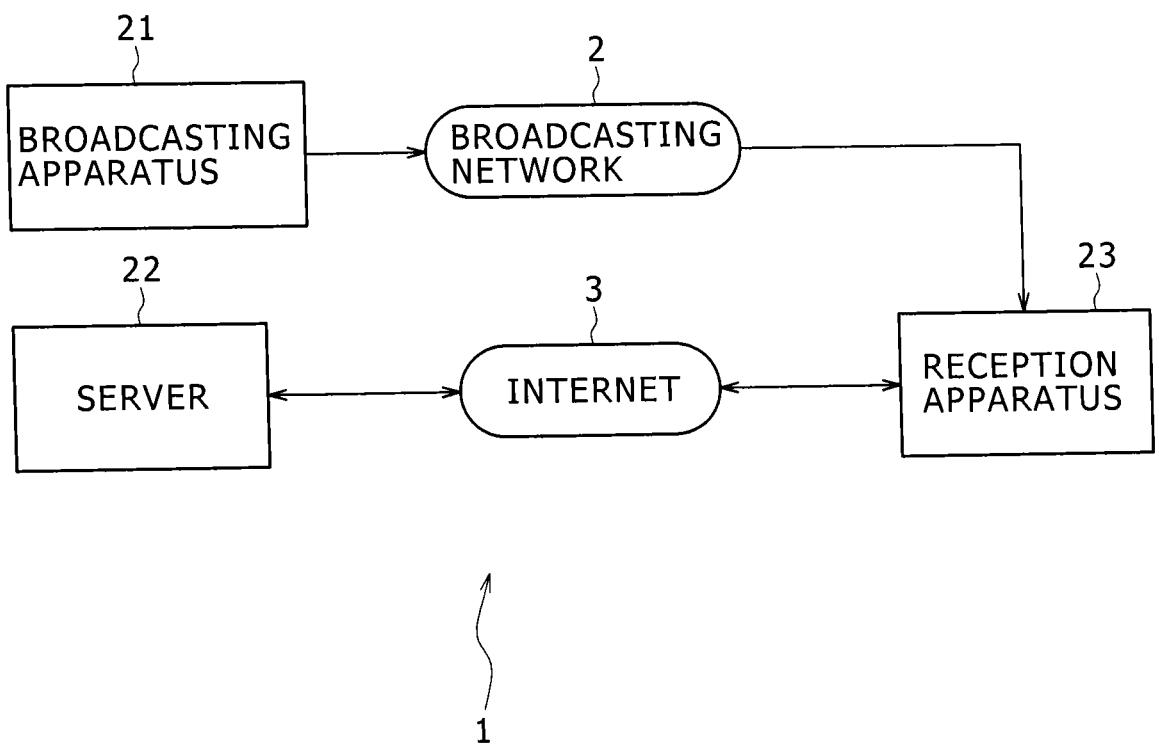
FIG. 1 is a diagram illustrating an exemplary configuration of a broadcasting system.

Referring to FIG. 1, there is shown an exemplary configuration of a broadcasting system.

A broadcasting system 1 is made up of a broadcasting apparatus 21 and a server 22 that are arranged on the broadcasting side and a reception apparatus 23 that is arranged on the receiver side.

The broadcasting apparatus 21 is configured to transmit a digital television broadcast signal through a broadcasting network 2, such as a terrestrial digital broadcasting network. By this digital television broadcast signal, broadcast content, such as a broadcast program and a broadcast CM, is transmitted.

In addition, the broadcasting apparatus 21 transmits trigger information as included in a digital television broadcast signal, the trigger information providing a command associated with an operation of an application program (hereafter referred to simply as an application) that is linked with broadcast content. To be more specific, trigger information is transmitted as arranged in a transport stream (thereafter referred to as a TS) of a digital television broadcast signal or as embedded in a video signal or an audio signal.

In addition to the information indicative of a type of command, trigger information includes information indicative of an acquisition source of an application. Details of trigger signal will be described later.

The server 22 supplies an application requested from the reception apparatus 23 that accessed the server 22 via the Internet 3.

The reception apparatus 23 receives a digital television broadcast signal from the broadcasting apparatus 21 and outputs a video signal and an audio signal that are broadcast content to a monitor (not shown). In addition, the reception apparatus 23 accesses the server 22 via the Internet 3 to get communication content. It should be noted that the reception apparatus 23 may be arranged as a standalone unit or as incorporated in a television receiver or a video recorder, for example.

The broadcasting system 1 is configured as shown below.

—Exemplary Configuration of the Broadcasting Apparatus

Figure 2:
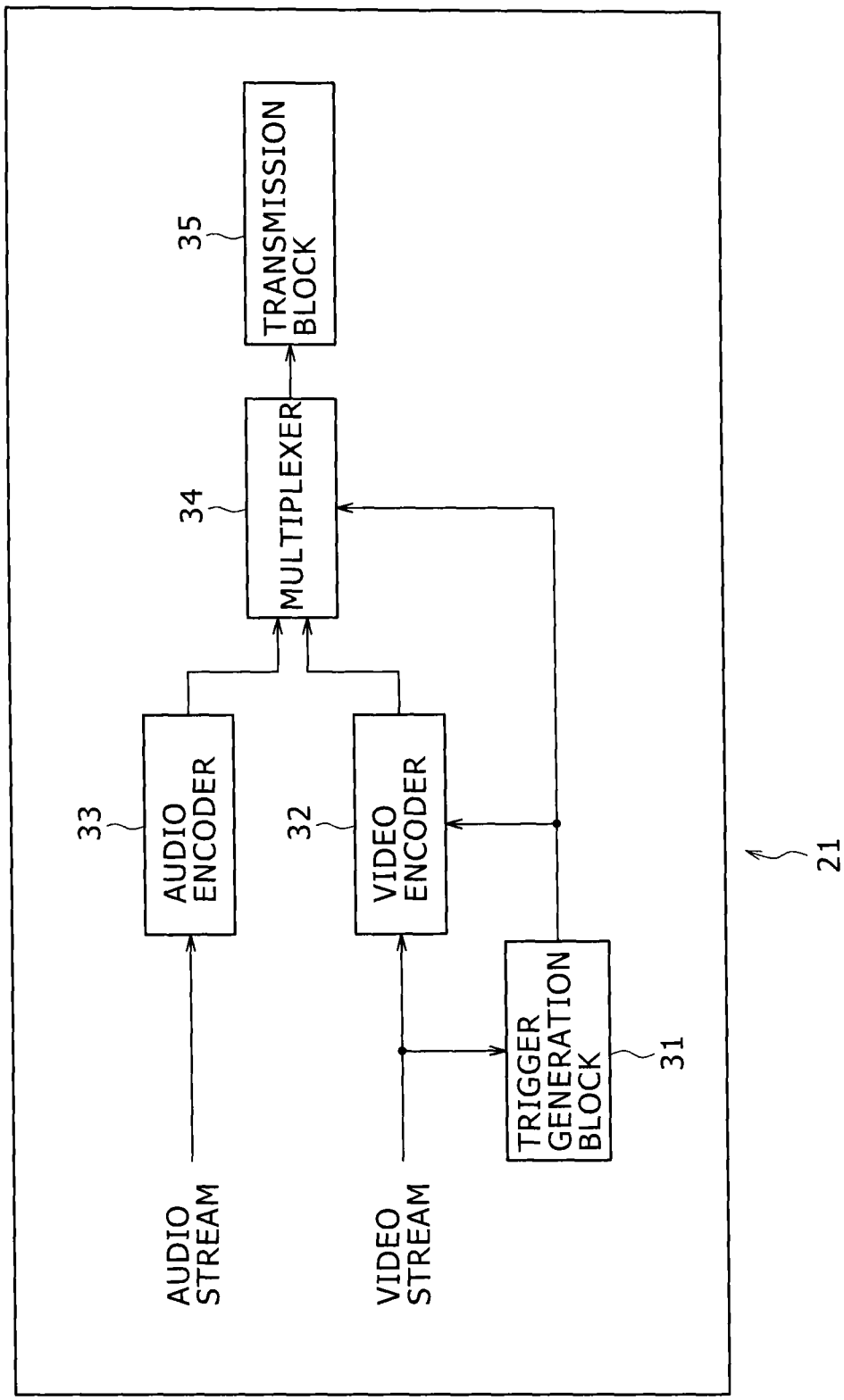
FIG. 2 is a diagram illustrating an exemplary configuration of a broadcasting apparatus.

Referring to FIG. 2, there is shown an exemplary configuration of the broadcasting apparatus.

The broadcasting apparatus 21 is made up of a trigger generation block 31, a video encoder 32, an audio encoder 33, a multiplexer 34, and a transmission block 35.

The trigger generation block 31 generates trigger information in match with the progression of a video stream of broadcast content, such as a program or a CM, entered from a preceding stage and outputs the generated trigger signal to the video encoder 32 and the multiplexer 34.

The video encoder 32 encodes the video stream of broadcast content, such as a program, entered from the preceding stage in accordance with a predetermined decoding scheme and supplies the encoded video stream obtained as a result of the encoding to the multiplexer 34. It should be noted that the encoding scheme used by the video encoder 32 includes MPEG2 (Moving Picture Experts Group Phase 2), H.264, and so on, for example.

In addition, in encoding a video stream, the video encoder 32 encodes the video stream by embedding the trigger information supplied from the trigger generation block 31 and outputs an encoded video stream obtained as a result of the encoding to the multiplexer 34.

The audio encoder 33 encodes an audio stream corresponding to the video stream to be entered in the video encoder 32 in accordance with a predetermined encoding scheme and supplies an encoded audio stream obtained as the result of the encoding to the multiplexer 34. It should be noted that the encoding scheme used by the audio encoder 33 includes AC3 (Audio Code number 3), AAC (Advanced Audio Coding), and so on, for example.

As described above, the multiplexer 34 is supplied with the encoded video stream from the video encoder 32, the encoded audio stream from the audio encoder 33, and the trigger information from the trigger generation block 31.

The multiplexer 34 multiplexes an encoded video stream with an encoded audio stream and with trigger signal, supplying a multiplexed stream obtained as a result of the multiplexing to the transmission block 35. To be more specific, these streams and information are multiplexed with each other into a TS. Alternatively, in consideration of the network distribution of digital television broadcasting, these streams and information may be multiplexed with each other into ISO base media file format (MP4).

The transmission block 35 transmits the multiplexed stream supplied from the multiplexer 34 as a digital television broadcast signal.

The broadcasting apparatus 21 is configured as described above.

It should be noted that, in the above-mentioned description, trigger information is embedded in a video stream and, at the same time, multiplexed with a multiplexed stream;

however, trigger information may be only embedded in a video stream or multiplexed with a multiplexed stream. Besides, trigger information may be transmitted in other methods, such as by embedding in an audio stream for example.

—Exemplary Configuration of the Reception Apparatus

Referring to FIG. 3, there is shown an exemplary configuration of the reception apparatus.

The reception apparatus 23 is made up of a tuner 61, a primary demultiplexer 62, a retention buffer 63, a retention control block 64, a secondary multiplexers 65 and 66, video decoders 67 and 74, an audio decoder 68, a FLUTE processing block 69, a switch 70, a synthesis block 71, a video output block 72, an audio output block 73, a video processing block 75, a trigger extraction block 76, a control block 77, a memory 78, an operator block 79, a communication I/F block 80, a cache memory 81, an application engine 82, an application memory 83, a storage 84, a streaming processing block 85, a switch 86, and a content decoder 87.

The tuner 61 receives and demodulates a digital television broadcast signal and supplies a multiplexed stream obtained as a result of the demodulation to the primary demultiplexer 62.

The primary demultiplexer 62 extracts a TS of a particular channel selected by the user from the multiplexed stream supplied from the tuner 61 and supplies the extracted TS to the retention buffer 63.

The retention buffer 63 is made up of a mass recording media, such as a HDD (Hard Disk Drive) or a semiconductor memory, for example. Under the control of the retention control block 64, the retention buffer 63 sequentially stores a TS (or data thereof) supplied from the primary demultiplexer 62. The TS stored in the retention buffer 63 is read from the retention buffer 63 under the control of the retention control block 64 to be supplied to the secondary demultiplexer 65. It should be noted that, if a so-called sub-screen display is executed, the TS stored in the retention buffer 63 is supplied to the secondary demultiplexer 66 as data for sub-screen display.

Under the control of the application engine 82, the retention control block 64 controls the retention buffer 63.

The secondary demultiplexer 65 separates the TS supplied from the retention buffer 63 into an encoded video stream and an encoded audio stream and supplies these streams to the video decoder 67 and the audio decoder 68, respectively. In addition, the secondary demultiplexer 65 extracts a TS packet attached with a predetermined identifier from the TS supplied from the retention buffer 63 and supplies the data of the extracted TS packet to the FLUTE processing block 69.

The video decoder 67 decodes the encoded video stream supplied from the secondary demultiplexer 65 and supplies a video signal obtained as a result of the decoding to the switch 70 and the trigger extraction block 76. It should be noted that the video decoder 67 executes decoding in accordance with an encoding scheme used by the video encoder 32 (refer to FIG. 2).

The audio decoder 68 decodes the encoded audio stream supplied from the secondary demultiplexer 65 and supplies an audio signal obtained as a result of the decoding to the switch 70. It should be noted that the audio decoder 68 executes the decoding in accordance with the encoding scheme used by the audio encoder 33 (refer to FIG. 2).

The switch 70 is supplied with the video signal from the video decoder 67, the audio signal from the audio decoder 68, and a video signal and an audio signal from the content decoder 87 to be described later.

Under the control of the application engine 82, the switch 70 supplies one of the video signals supplied from the video decoder 67 and the content decoder 87 to the synthesis block 71. In addition, under the control of the application engine 82, the switch 70 supplies one of the audio signals supplied from the audio decoder 68 and the content decoder 87 to the audio output block 73.

The secondary demultiplexer 66 is supplied with a TS from the retention buffer 63 if sub-screen display is executed. The secondary demultiplexer 66 separates the TS supplied from the retention buffer 63 into an encoded video stream and supplies this encoded video stream to the video decoder 74.

The video decoder 74 decodes the encoded video streams supplied from the secondary demultiplexer 66 in accordance with a scheme corresponding to the encoding scheme used by the video encoder 32 (refer to FIG. 2) and supplies a video signal obtained as a result of the decoding to the video processing block 75.

The video processing block 75 execute resize processing for reducing the size of video on the video signal supplied from the video decoder 74 and supplies a video signal obtained as a result of the resize processing to the synthesis block 71.

The synthesis block 71 is supplied with a video signal of an application from the application engine 82 in addition to the video signals from the switch 70 and the video processing block 75.

The synthesis block 71 supplies the video signal supplied from the switch 70 to the video output block 72. In addition, if one or both of the video signal from the video processing block 75 and the video signal of the application from the application engine 82 are supplied, then the synthesis block 71 synthesizes the supplied video signal or signals on the video signal from the switch 70 and supplies a synthesized video signal to the video output block 72.

The video output block 72 outputs the video signal supplied from the synthesis block 71 to a succeeding stage (a display monitor for example).

The audio output block 73 outputs the audio signal supplied from the switch 70 to a succeeding stage (a loudspeaker for example).

The trigger extraction block 76 always monitors the video signal supplied from the video decoder 67 and extracts trigger information embedded in the video signal, outputting the extracted trigger signal to the control block 77.

It should be noted that, if trigger information is included in a PCR (Program Clock Reference) packet of a TS of a digital television broadcast signal, then the trigger extraction block 76 is supplied with the PCR packet including trigger signal and extracts this trigger signal from the PCR packet. If trigger signal is embedded in an audio signal, the trigger extraction block 76 is supplied with an audio signal and always monitors this audio signal, thereby extracting the trigger signal embedded in this audio signal.

By executing a control program stored in the memory 78, the control block 77 controls an operation of each of components of the reception apparatus 23. In addition, on the basis of trigger information supplied from the trigger extraction block 76, the control block 77 controls the acquisition or registration or startup of an application, an event firing, suspension, or termination, for example.

Receiving various operations done from the user, the operator block 79 supplies corresponding operation signals to the control block 77.

Under the control of the application engine 82, the communication I/F 80 connects the reception apparatus 23 to the server 22 via the Internet 3. Under the control of the control block 77, the application engine 82 gets an application from the server 22 via the communication I/F 80 and the Internet 3 and stores the obtained application into the cache memory 81.

Under the control of the control block 77, the application engine 82 reads and executes the application stored in the cache memory 81. A video signal of the active application is supplied to the synthesis block 71.

The application memory 83 is made up of a work memory 83A and a save memory 83B. The application engine 82 records data associated with an active application (to be more specific, this data includes a layer of displayed information and so on). In addition, if an active application is to be suspended, the application engine 82 moves the data from the work memory 83A of the application memory 83 to the save memory 83B. Then, to restart the suspended application, the application engine 82 moves the data from the save memory 83B to the work memory 83A to resume the status as it was before the suspension.

The FLUTE processing block 69 gets files identified by a FLUTE session from the data of a TS packet supplied from the secondary demultiplexer 65 and records data made up of these files to the storage 84 as content data. The storage 84 is made up of a mass-storage recording media, such as a HDD for example.

FLUTE (File Delivery over Unidirectional Transport) is a communication protocol capable of data distribution by use of a single-direction transmission path (a downstream-only transmission path for example) and can transmit any files. A FLUTE session is identified on the basis of NRT-IT (NRT Information Table) in which information about content download is written in NRT (Non Real Time) broadcasting, for example. In the FLUTE processing block 69, a file identified by this FLUTE session is obtained. Consequently, the storage 84 stores the content (hereafter referred to as NRT content) obtained by NRT broadcasting.

It should be noted that NRT broadcasting is a service for reproducing broadcast content recorded to a storage. For NRT-IT, refer to Japanese Patent Laid-open No. 2011-41242 applied by the applicant hereof, for example.

Details of FLUTE are Specified as RFC3926.

Under the control of the application engine 82, the communication I/F 80 receives communication content from the server 22 via the Internet 3. Under the control of the application engine 82, the communication I/F 80 records the received communication content if download reproduction is executed. In addition, under the control of the application engine 82, the communication I/F 80 supplies the received communication content to the streaming processing block 85 if streaming reproduction is executed.

The streaming processing block 85 executes processing necessary for executing streaming reproduction on the communication content (or data thereof) supplied from the communication I/F 80 and supplies the communication content for streaming reproduction obtained as a result of this processing to the switch 86.

The switch 86 is supplied with the NRT content or communication content for download reproduction from the storage 84 and the communication content for streaming reproduction from the streaming processing block 85. Under the control of the application engine 82 the switch 86 selects the NRT content or the communication content for download reproduction and supplies the selected content to the content decoder 87 if download reproduction is executed. If streaming reproduction is executed, the switch 86 executes the communication content for streaming reproduction under the control of the application engine 82 and supplies the selected communication content to the content decoder 87.

The content decoder 87 separates the encoded AV stream forming the NRT content or the communication content for download reproduction or the communication content for streaming reproduction supplied from the switch 86 into an encoded video stream and an encoded audio stream. The content decoder 87 decodes the encoded video stream and the encoded audio stream obtained as a result of separation and supplies a video signal and an audio signal obtained as a result of the decoding to the switch 70.

The reception apparatus 23 is configured as shown below.

It should be noted that, in the reception apparatus 23, the NRT content or communication content for download reproduction or the communication content for streaming reproduction is inserted during the reception of broadcast content supplied via the broadcasting network 2; the content inserted during the reception of these types of broadcast content is herein referred to a inserted content. In what follows, the communication content for streaming reproduction among the inserted content will be mainly described for the brevity of description.

—Details of Trigger Information

The following describes details of trigger information. Trigger information is used to control applications. Trigger information includes commands, such as register, execute, inject event, suspend, and terminate, for example.

Referring to FIG. 4, there are shown items included in trigger information that provides a register command. A register command is used to instruct the reception apparatus 23 to get and register an application.

Trigger_id is information for identifying trigger information concerned. If trigger information having the same contents is transmitted two or more times, Trigger_id of each piece of trigger information is the same as that of the other trigger information. Protocol_version is indicative of the version of the protocol of the trigger information concerned. Command_code is indicative of the type of the command of the trigger information concerned. In the example shown in FIG. 4, information indicative of a register command is written.

Trigger_validity is a server access distribution parameter value indicative of a probability that each reception apparatus 23 that has received the trigger information concerned executes processing in accordance with the trigger information concerned.

App_id is identification information of an application to be obtained in response to the trigger information concerned. In addition, App_id is also indicative of the URL of an acquisition source (the server 22 in this example) of an application to be obtained in response to the trigger information concerned.

App_type is information indicative of the type (HTML5, Java, or the like) of an application corresponding to the trigger information concerned. App_life_scop is information indicative of a life scope of an application.

Persistent_priority is indicative of a priority with which a corresponding application is obtained and held. Expire_date is information indicative of the expiration of the holding period of an application. If an application is registered, the priority (Persistent_priority) and the holding limit period (Expire_date) are stored and the registered application is managed in accordance with these priority and holding limit period.

Referring to FIG. 5, there are shown items included in trigger information that provides an execute command. An execute command instructs the reception apparatus 23 to start up an application.

Items included in the trigger information that provides an execute command are substantially the same as those included in the trigger information that provides a register command shown in FIG. 4. However, Command_code is written with information indicative of an execute command.

Referring to FIG. 6, there are shown items included in trigger information that provides an inject event command (Inject_event). An inject event command instructs the reception apparatus 23 to fire an event in an active data broadcast application.

Trigger_id, Protocol_version, Command_code, Trigger_validity, App_id, and App_type are substantially the same as those included in the trigger information that provides a register command shown in FIG. 4. However, Command_code is written with information indicative of an inject event command.

Event_id is identification information indicative of an event to be fired in an application specified by App_id. Event Embedded Data is referenced when an event is fired.

Referring to FIG. 7, there are shown items included in trigger information that provides a suspend command. A suspend command instructs the reception apparatus 23 to suspend an active application.

Trigger_id, Protocol_version, Command_code, Trigger_validity, and App_id are substantially the same as those included in the trigger information that provides a register command shown in FIG. 4. However, Command_code is written with information indicative of a suspend command.

Referring to FIG. 8, there are shown items included in trigger information that provides a terminate command. A terminate command instructs the reception apparatus 23 to terminate an active application.

Trigger_id, Protocol_version, Command_code, Trigger_validity, and App_id are substantially the same as those included in the trigger information that provides a register command shown in FIG. 4. However, Command_code is written with information indicative of a terminate command.

Referring to FIG. 9 there is shown one example of a syntax of trigger information that can handle the trigger information of each command described above. It should be noted that trigger information can be written in any syntax and therefore is not limited to the syntax shown in FIG. 9.

—Operation Scenario

Figure 10:
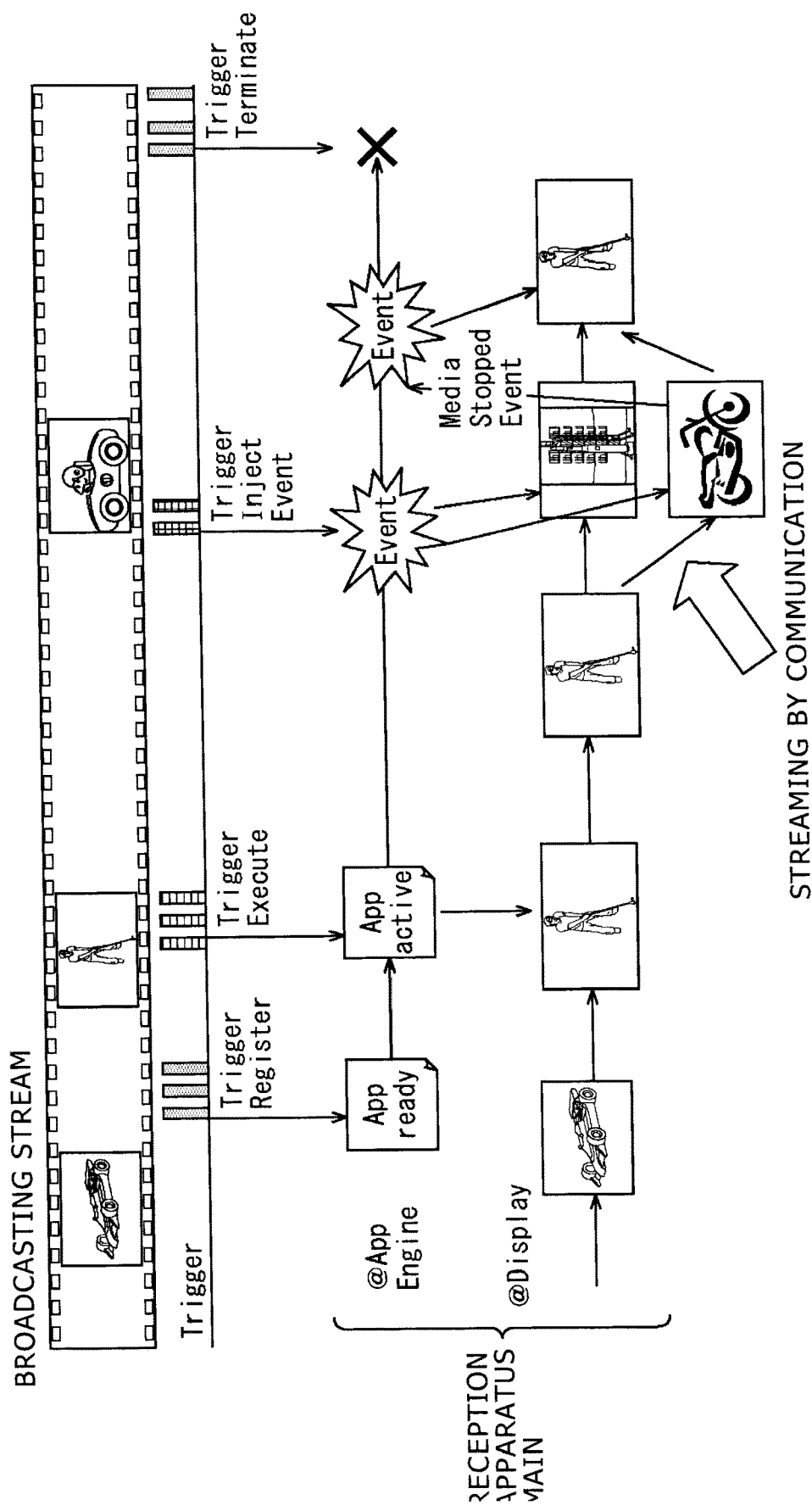
FIG. 10 is a diagram showing an exemplary operation scenario.

Use of the above-mentioned trigger information allows an operation of an application as shown in FIG. 10, for example.

When the broadcasting apparatus 21 transmits trigger information that provides a register command for instructing the reception apparatus 23 to register an application corresponding to a program along with the progression of this program (or broadcast content), the reception apparatus 23 gets and register the specified application.

Next, when the broadcasting apparatus 21 transmits trigger information that provides an execute command for the application corresponding to this program to the reception apparatus 23, the reception apparatus 23 starts up this application.

In this startup operation, the application is not displayed but the video of the program is displayed continuously, for example. It should be noted that an icon indicative that the display of the application is prepared may be displayed as superimposed on the video of the program when the application is started up. In this case, when this icon is clicked by the user, the display by the application is superimposed on the video or the program on the screen.

Next, when the broadcasting apparatus 21 transmits trigger information that provides an inject event command along with the progression of the program to the reception apparatus 23, the reception apparatus 23 fires an active application. This event firing switches the broadcast content that is the video of the program to the communication content (or inserted content) that is streaming-distributed via the Internet 3, thereby streaming-reproducing the communication content.

Then, when the streaming reproduction of the communication content is terminated, a terminate event (a media stopped event shown in FIG. 10) is firing, upon which the communication content is switched to the broadcast content, thereby displaying the video of this program.

Next, when the broadcasting apparatus 21 transmits trigger information that provides a terminate command along with the termination of the program to the reception apparatus 23, the reception apparatus 23 terminates the active application.

It should be noted that, although not shown, when the broadcasting apparatus 21 transmits trigger information that provides a suspend command for an application to the reception apparatus 23 with a predetermined timing, the reception apparatus 23 suspends the active application. Then, when the broadcasting apparatus 21 transmits trigger information that provides an execute command for an application to the reception apparatus 23, the reception apparatus 23 restarts the suspended application.

—Exemplary Operation to be Executed at Switching Between Broadcast Content and Communication Content Referring to FIGS. 11A and 11B, there are shown exemplary modes of switching between broadcast content and communication content.

It should be noted that communication content is viewed by so-called VOD (Video On Demand), so that, in what follows, viewing of communication content (or video of communication) is also referred to as VOD appropriately.

Figure 11:
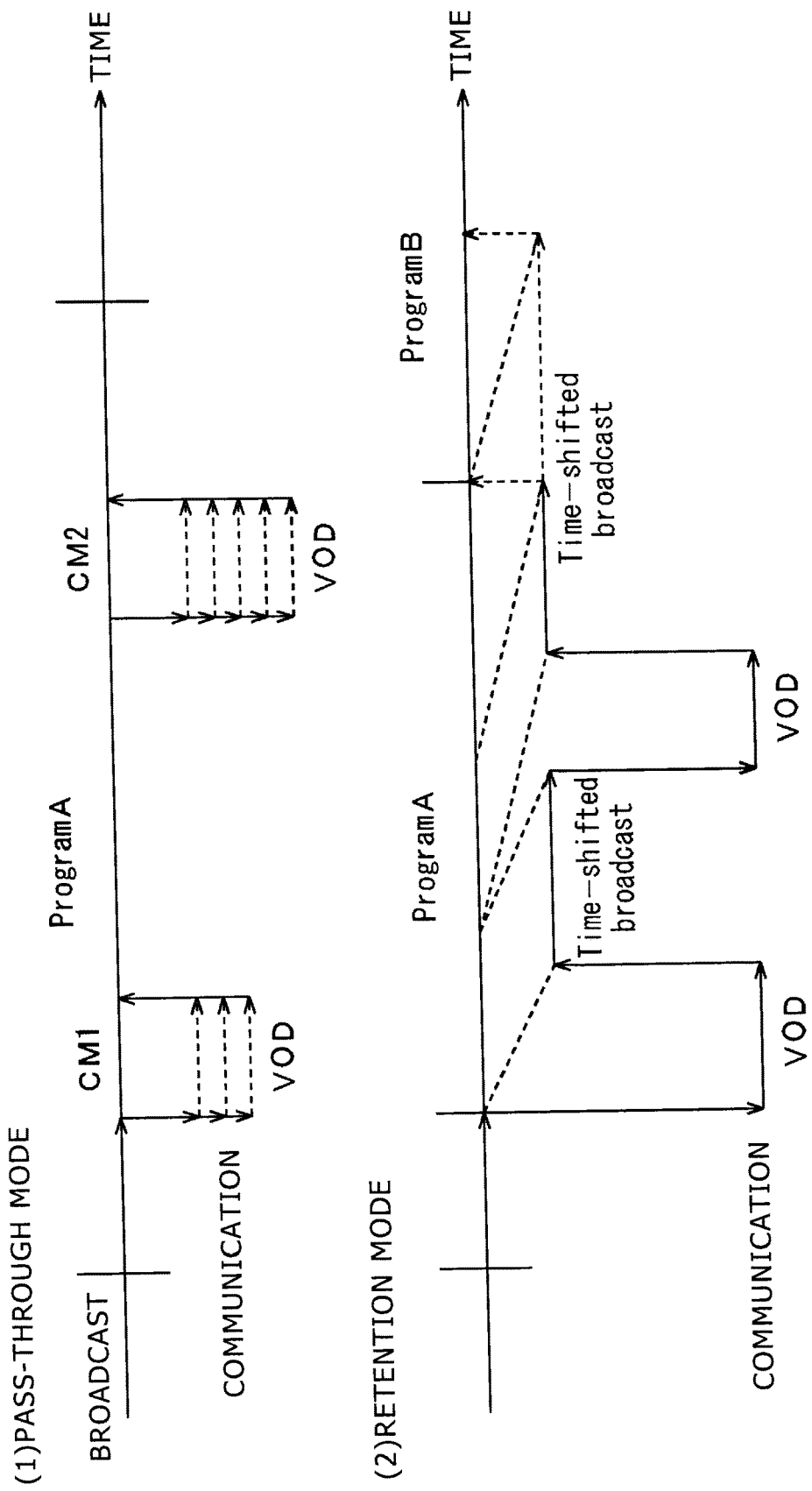
FIG. 11 are diagrams showing modes at the time of switching between broadcast content and communication content.

As shown in FIG. 11, switching between broadcast content and communication content uses one of two switching modes; a pass-through mode and a retention mode.

First, the pass-through mode is described.

In the pass-through mode, when broadcast content is switched to communication content to display communication content and then communication content is switched back to broadcast content, switching is made to the broadcast content being broadcast at that moment.

For example, if a certain program (Program A) is being broadcast as broadcast content as shown in FIG. 11, switching to communication content may be executed only when CM1 and CM2 to be inserted in the program are broadcast. In this case, when communication content is switched to broadcast content again, the broadcast content while the communication content, such as CM1 and CM2, is displayed is not displayed, but the program (Program A) being broadcast at this point of time is displayed.

Figure 12:
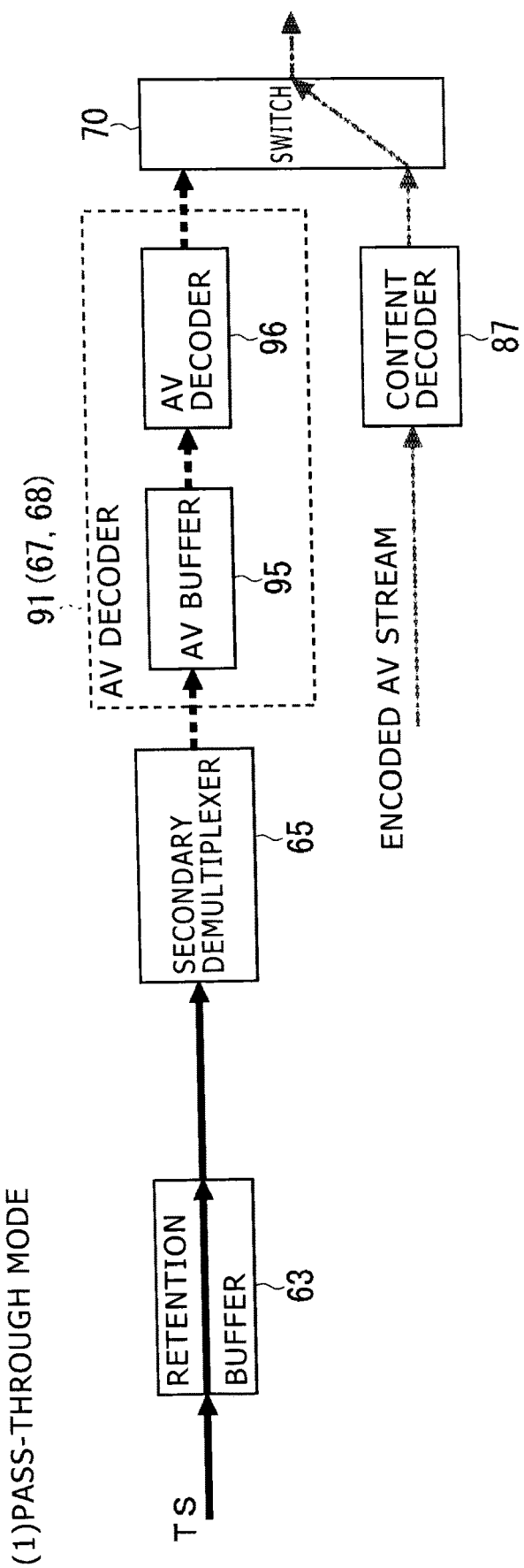
FIG. 12 is a diagram illustrating an exemplary operation of the reception apparatus with a pass-through mode set.

Referring to FIG. 12, there are shown exemplary operations of component blocks of the reception apparatus 23 when the pass-through mode is set thereon.

Figure 13:
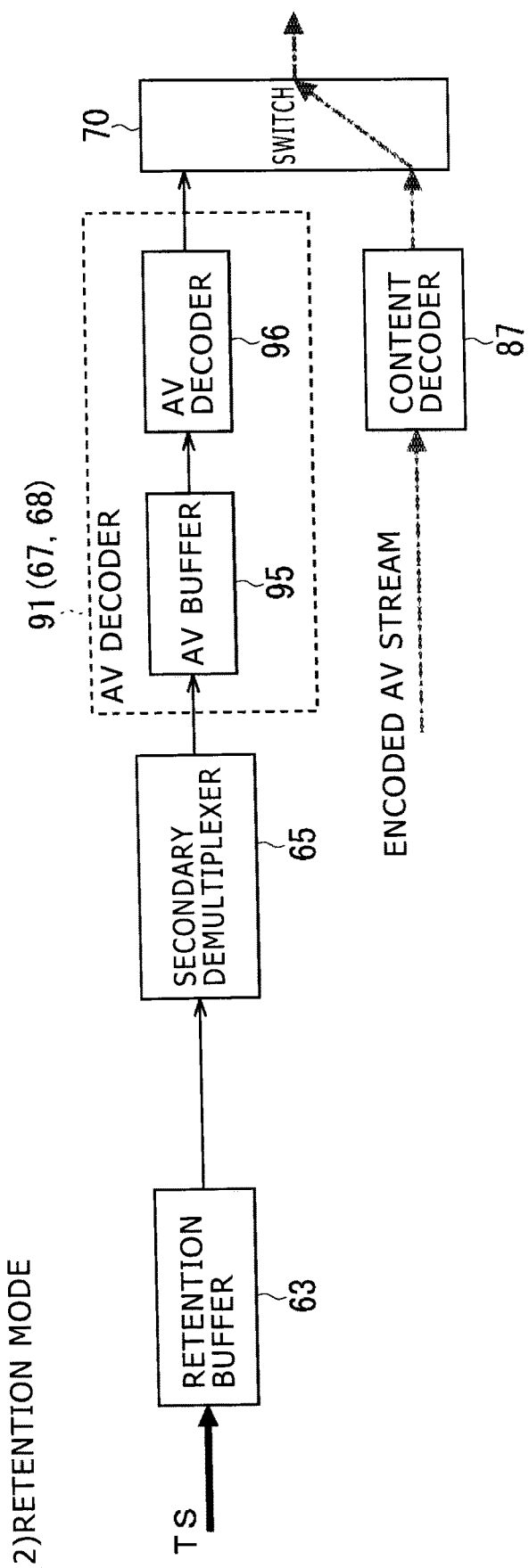
FIG. 13 is a diagram illustrating an exemplary operation of the reception apparatus with a retention mode set.

It should be noted that, in FIG. 12 and FIG. 13, the functions of the video decoder 67 and the audio decoder 68 are handled as one function of the news gathering item creation terminal 91 for the brevity of description. Therefore, it is assumed that decoding of encoded video streams and encoded audio streams be executed by the news gathering item creation terminal 91. The news gathering item creation terminal 91 is formed by an AV buffer 95 and an AV decoder 96.

As shown in FIG. 12, in the reception apparatus 23, if broadcast content is viewed, the data of a TS from the primary demultiplexer 62 is supplied to the secondary demultiplexer 65 via the retention buffer 63 to be separated into an encoded video stream and an encoded audio stream, which are supplied to an AV decoder 91.

The AV decoder 96 sequentially reads and decodes the encoded video stream and the encoded audio stream stored in the AV buffer 95 and supplies a video signal and an audio signal obtained as a result of the decoding to the switch 70. If broadcast content is viewed, the switch 70 supplies the video signal from the AV decoder 96 to the video output block 72 via the synthesis block 71 and supplies the audio signal to the audio output block 73.

Consequently, the broadcast content is displayed on the screen.

Next, when trigger information that provides an inject event command is received from the broadcasting apparatus 21 and the screen display is switched from broadcast content to communication content by this event firing, the content decoder 87 gets an encoded AV stream of the communication content for streaming reproduction from the streaming processing block 85. The content decoder 87 decodes the obtained encoded AV stream and supplies a video signal and an audio signal obtained as a result of the decoding to the switch 70. If communication content is viewed, the switch 70 supplies the video signal from the content decoder 87 to the video output block 72 via the synthesis block 71 and supplies the audio signal to the audio output block 73.

Consequently, the communication content is displayed on the screen.

At this moment, the retention buffer 63 supplies the data of a TS from the primary demultiplexer 62 to the secondary demultiplexer 65 by zero delay (bypass). Then, because the data of the broadcast content while the communication content is being displayed is not necessary, the data of the TS is stopped by the secondary demultiplexer 65 to be discarded.

It should be noted that if so-called time-shift reproduction was being executed at the time of switching, for example, the data of the TS is stored in the retention buffer 63 so as to maintain a fixed delay time at the time of switching to communication content. It should also be noted that, the data of the unnecessary TS may be stopped by the switch 70 after decoding by the AV decoder 91 to be discarded, in addition to the stopping by the secondary demultiplexer 65.

Subsequently, if the communication content displayed on the screen is terminated and a terminate event is fired to return the screen display from the communication content to the broadcast content, the switch 70 switches the input destination of the video signal and the audio signal from the content decoder 87 to the AV decoder 91.

At this moment, because the data of the TS to be stored in the retention buffer 63 has not been delayed, the video signal and the audio signal supplied from the switch 70 to the video output block 72 and the audio output block 73, respectively, are not delayed.

To be more specific, when the switching has been made from the communication content back to the broadcast content, the broadcast content being broadcast at this switching is displayed.

The pass-through mode is executed as described below.

On the other hand, in the retention mode, when broadcast content is switched to communication content to display communication content and then communication content is switched back to broadcast content, switching is made to the broadcast content at the time of the switching from broadcast content to communication content.

For example, as shown in FIG. 11, if a certain program (program A) is being broadcast as broadcast content, the broadcast content may be switched to the communication content at a predetermined time. In this case, the communication content is inserted in the broadcast content, so that, while the communication content is displayed, the data of the broadcast content in that period is stored in a buffer (the retention buffer 63). Next, when the communication content has been switched back to the broadcast content, the data of the broadcast content is read from the buffer, thereby restarting the program (Program A) from the switching point with a temporal shift to display the restarted program.

It should be noted that if, when the communication content has been switched back to the broadcast content, a program (Program A) broadcast realtime has been terminated and another program (Program B) starts, the broadcast content may be restarted halfway in the program (Program A) or from the beginning of another program (Program B).

Referring to FIG. 13, there are shown exemplary operations of component blocks of the reception apparatus 23 when the retention mode is set thereon.

In the reception apparatus 23 shown in FIG. 13, like the example shown in FIG. 12, if broadcast content is viewed, an encoded video stream and an encoded audio stream obtained by the secondary demultiplexer 65 are supplied to the AV decoder 91. The AV decoder 91 decodes the encoded video stream and the encoded audio stream through the AV decoder 96 and a video signal and an audio signal obtained as a result of the decoding are supplied to the video output block 72 and the audio output block 73, respectively, via the switch 70.

Consequently, the broadcast content is displayed on the screen.

Next, trigger information that provides an inject event command is received from the broadcasting apparatus 21. When the screen display is switched from broadcast content to communication content by this event firing, the encoded video stream is decoded by the content decoder 87 line the example shown in FIG. 12. A video signal and an audio signal obtained as a result of the decoding are supplied to the video output block 72 and the audio output block 73, respectively, via the switch 70.

Consequently, the communication content is displayed on the screen.

At this moment, the retention buffer 63 is sequentially written with the data of a TS from the primary demultiplexer 62 and stored. This is because the reading of the written data is stopped, the data of a TS at the time when the communication content is being displayed is sequentially stored in the retention buffer 63. At the same time, in order for the AV decoder 96 to execute decoding, the encoded video stream and the encoded audio stream stored in the AV buffer 95 can be kept held.

Next, if the screen display is switched from communication content to broadcast content when a terminate event is fired after the termination of the communication content displayed on the screen, the input destination of the video signal and the audio signal is switched from the content decoder 87 to the AV decoder 91 by the switch 70.

At this moment, because the data of a TS at the time when the communication content is being displayed is stored in the retention buffer 63, this data of a TS is supplied to the secondary demultiplexer 65 to be separated into an encoded video stream and an encoded audio stream, which are supplied to the AV decoder 96. Next, while the communication content is displayed, the AV decoder 96 decodes the encoded video stream and the encoded audio stream stored in the AV buffer 95 and then decodes the encoded video stream and the encoded audio stream supplied from the secondary demultiplexer 65. Consequently, the video signal and the audio signal supplied to the video output block 72 and the audio output block 73, respectively, from the switch 70 provide a video signal and an audio signal at the time when the broadcast content has been switched to the communication content.

To be more specific, when the communication content has been switched back to the broadcast content, the broadcast content at the time when the broadcast content was switched to the communication content is displayed on the screen.

The retention mode is executed as described above.

—Exemplary Description of Application

The following describes an exemplary description of an application that is used to execute switching between broadcast content and communication content. This application is written in a markup language, such as HTML (HyperText Markup Language), for example.

Referring to FIG. 14, there is shown an exemplary description of an application of the pass-through mode.

Each object element includes id attribute, type attribute, and style attribute. Broadcast content and communication content are specified by different object elements.

To the object element for displaying broadcast content, "aaa" is written as id attribute for identifying the object element and "video/broadcast" is written as type attribute for distinguishing between broadcast content and communication content. For style attribute for specifying whether to display broadcast content or communication content on the screen, "visibility:visible" is written.

To the object element for displaying communication content, "bbb" is written for id attribute, "video/mpeg" is written for type attribute, and "visibility:hidden" is written for style attribute.

To be more specific, "visibility:visible" is written to style attribute of object element of broadcast content and "visibility:hidden" is written to style attribute of object element of communication content, so that broadcast content is displayed as an initial status.

Previously specifying retention_mode as system attribute of the reception apparatus 23 that is specified by an application makes the reception apparatus 23 to operate in the retention mode if retention_mode=true is set and in the pass-through mode if retention_mode=false is set. This retentiom_mode is set to false in the initial status, so that, in the case of an application of the pass-through mode, retention_mode=false is fixed and therefore not changed.

A change_stream function defined in function on the upper line is used to execute display switching if switching is executed from broadcast content to communication content. If broadcast content is switched to communication content by this change_stream function, broadcast content gets in a non-display status and communication content is displayed.

A change_stream function defined in function on the lower line is used to execute display switching if switching is executed from communication content to broadcast content. If communication content is switched to broadcast content by this change_stream function, communication content gets in a non-display status and broadcast content is displayed.

An application in the pass-through modes is described as shown below.

Referring to FIG. 15, there is shown an exemplary description of an application of the pass-through mode.

In FIG. 15, the object elements of broadcast content and communication content are written substantially in the same manner as the example shown in FIG. 14.

A change_stream function defined in function on the upper line is used to execute display switching if switching is executed from broadcast content to communication content. If broadcast content is switched to communication content by this change_stream function, broadcast content gets in a non-display status and communication content is displayed. In addition, a value of retention_mode is changed from false to true, thereby setting the retention mode.

A change_stream function defined in function on the lower line used to execute display switching if switching is executed from communication content to broadcast content. If communication content is switched to broadcast content by this change_stream function, communication content gets in a non-display status and broadcast content is displayed. In addition, a value of retention_mode is changed from true to false, thereby clearing the retention mode and setting the pass-through mode.

An application of the retention mode is written as described above.

—Trigger Handling Processing

Figure 16:
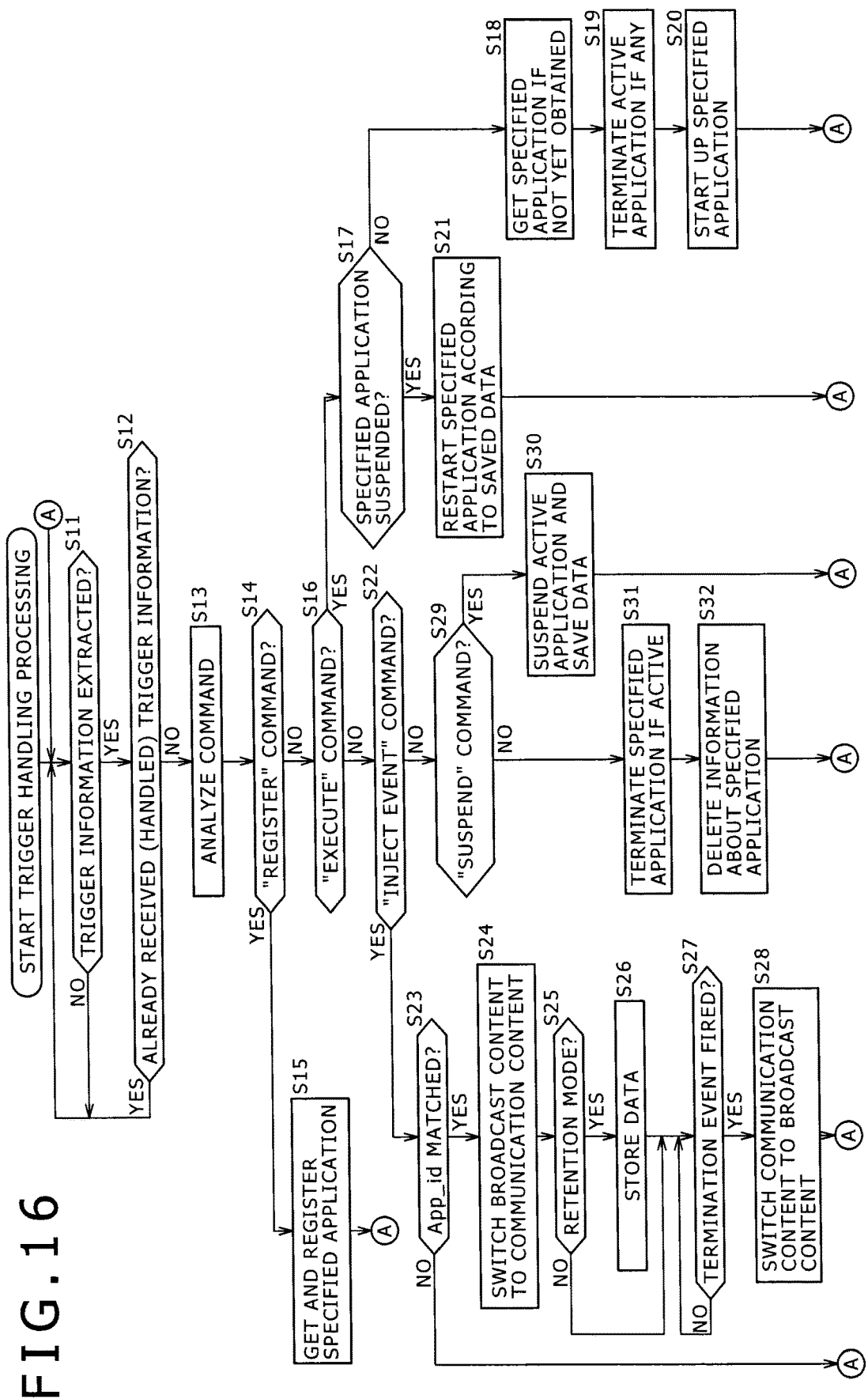
FIG. 16 is a flowchart indicative of trigger handling processing.

The following describes trigger handling processing that is executed by the reception apparatus 23 with reference to the flowchart shown in FIG. 16.

In step S11, the control block 77 waits until trigger information is extracted by the trigger extraction block 76 and the extracted trigger information is supplied. If the trigger information is supplied, the procedure goes to step S12.

In step S12, the control block 77 reads Trigger_id of the trigger information to determine whether the processing operations of steps S13 and on have already executed on this trigger information or not. If the processing operations of steps S13 and on are found executed on this trigger information, then the procedure is returned to step S11 to repeat the above-mentioned processing therefrom. On the other hand, if the processing operations of steps S13 and on are found not yet executed on this trigger information, then the procedure goes to step S13.

In step S13, the control block 77 reads Command_code of trigger information to determine whether the command indicated by this trigger information is any one of a register command, an execute command, an inject event command, a suspend command, or a terminate command.

In step S14, the control block 77 determines whether a determination result of step S13 is a register command or not. If the determination result is found to be a register command, then the procedure goes to step S15.

In step S15, data of an application identified by App_id of this trigger information is obtained and registered. Subsequently, the procedure returns to step S11 to repeat the above-mentioned processing therefrom.

In step S14, if the determination result of step S13 is found not to be a register command, then the procedure goes to step S16. In step S16, the control block 77 determines whether the determination result of step S13 is an execute command or not. If the determination result of step S13 is found to be an execute command, then the procedure goes to step S17.

In step S17, under the control of the control block 77, the application engine 82 determines whether the application identified by App_id of this trigger information is in a suspended status or not. To be more specific, the application engine 82 determines that the application is in a suspended status if data indicative of a suspended status is saved to the application identified by App_id.

In step S17, if the application identified by App_id is found to be not in a suspended status, then the procedure goes to step S18. In step S18, if program data of the application identified by App_id has not been obtained (namely, not found in the cache memory 81), the application engine 82 gets this program data under the control of the control block 77.

In step S19, if there is any active application, the application engine 82 terminates the active application under the control of the control block 77.

In step S20, under the control of the control block 77, the application engine 82 starts up the application identified by App_id. Subsequently, the procedure returns to step S11 to repeat the above-mentioned processing therefrom.

It should be noted that, if the application identified by App_id is found to be in a suspended status in step S17, then the procedure goes to step S21. In step S21, under the control of the control block 77, the application engine 82 moves the data from the save memory 83B to the work memory 83A, thereby starting up the application identified by App_id. Consequently, the suspended application identified by App_id is restarted from the suspended status. Subsequently, the procedure returns to step S11 to repeat the above-mentioned processing therefrom.

In step S16, if the determination result of step S13 is found to be not an executed command, then the procedure goes to step S22. In step S22, the control block 77 determines whether the determination result of step S13 is an inject event command or not. If the determination result in step S13 is found to be an inject event command, then the procedure goes to step S23.

In step S23, the control block 77 determines whether App_id of this trigger information matches App_id of the active application. If a match is found, the procedure goes to step S24, in which the control block 77 controls the application engine 82 to fire (or execute) an event corresponding to Event_id of trigger information. An event for switching between broadcast content and communication content is related with this Event_id.

Namely, under the control of the control block 77, the application engine 82 executes the processing of switching the broadcast content displayed on the screen to the communication content (step S24) if there is a match in App_id. Here, the processing is executed in which the change_stream function written to the application is executed, the broadcast content is put in a non-display status, and the communication content is put in a display status.

To be more specific, the application engine 82 controls the communication I/F 80 to receive communication content from the server 22 via the Internet 3 and supplies the received communication content to the streaming processing block 85. At the same time, by switching the input destination of the switch 86 to the streaming processing block 85, the application engine 82 supplies an encoded AV stream from the streaming processing block 85 to the content decoder 87. The content decoder 87 separates the supplied encoded AV stream into an encoded video stream and an encoded audio stream and the decodes these streams, supplying a video signal and an audio signal obtained as a result of the decoding to the switch 70. Next, by switching the input destination of the switch 70 to the content decoder 87, the application engine 82 supplies the video signal and the audio signal from the content decoder 87 to the video output block 72 and the audio output block 73, respectively.

It should be noted that the input destination of the switch 86 is switched to the storage 84 for reproducing the NRT content or the communication content for download reproduction.

Consequently, the streaming reproduction of communication content starts.

In step S25, the application engine 82 determines whether the retention mode has been set or not. As shown in FIG. 15, for example, in the case of an application of the retention mode, retention_mode is changed from false to true, so that the application engine 82 determines that the retention mode is set, upon which the procedure goes to step S26.

In step S26, the application engine 82 controls the retention control block 64 to sequentially store the data of a TS into the retention buffer 63. The operations to be executed by the component blocks of the reception apparatus 23 are substantially the same as those previously described with reference to FIG. 13.

As shown in FIG. 14, for example, in the case of an application of the pass-through mode, retention_mode=false is set in a fixed manner, so that the application engine 82 determines that the pass-through mode is set, upon which the procedure goes to step S27 by skipping step S26. The operations for setting the pass-through mode to be executed by the component blocks of the reception apparatus 23 are substantially the same as those previously described with reference to FIG. 12.

In step S27, the application engine 82 determines whether the streaming reproduction of the communication content terminated and a terminate event (or an media stopped event) has been fired or not.

If the terminate event is found not fired in step S27, then the determination processing of step S27 is repeated. Namely, while the communication content is displayed on the screen, the data of a TS is sequentially stored in the retention buffer 63 in the case of the retention mode and the retention buffer 63 is bypassed in the case of the pass-through mode.

Next, if a terminate event is fired after the termination of the streaming reproduction of the communication content, the procedure goes to step S28. In step S28, the application engine 82 executes the processing of switching the communication content displayed on the screen to the broadcast content. Here, the change_stream function written to the application is executed and the communication content is put in a non-display status and the broadcast content is put in a display status.

To be more specific, the application engine 82 switches the input destination of the switch 70 from the content decoder 87 to the video decoder 67 and the audio decoder 68, thereby supplying the video signal and an audio signal from the video decoder 67 and the audio decoder 68 to the video output block 72 and the audio output block 73, respectively.

At this moment, in the case of an application of the retention mode, the data of a TS at the time when the communication content was being displayed is stored in the retention buffer 63 as shown in FIG. 13, the video signal and the audio signal at the time at which the broadcast content obtained from this data was switched to the communication content are supplied to the video output block 72 and the audio output block 73, respectively.

Namely, in the case of the retention mode, when the communication content has been switched back to the broadcast content, the broadcast content at the time when broadcast content is switched to communication content is displayed on the screen and restarted.

In addition, the change_stream function written to the application is executed and retention_mode is changed from true to false, so that the retention mode is cleared and the pass-through mode is set.

On the other hand, as shown in FIG. 12, in the case of the pass-through mode, the data of a TS at the time when the communication content was being displayed is not stored in the retention buffer 63, the video signal and the audio signal of the broadcast content being broadcast at that point of time are supplied to the video output block 72 and the audio output block 73, respectively.

Namely, in the case of pass-through mode, when the communication content has been switched back to the broadcast content, the broadcast content being broadcast at that point of time is displayed on the screen and restarted.

Subsequently, the procedure returns to step S11 to repeat the above-mentioned processing therefrom.

If the determination result of step S13 is found not to be an inject event command, then the procedure goes to step S29. In step S29, the control block 77 determines whether the determination result of step S13 is a suspend command or not. If the determination result is found to be a suspend command, then the procedure goes to step S30.

In step S30, under the control of the control block 77, the application engine 82 saves the data indicative of the status of the currently active application (namely, the data currently written to the work memory 83A; if the information to be displayed has a layer structure, this data includes the information of the layer structure of the displayed information) into the save memory 83B. Subsequently, the procedure returns to step S11 to repeat the above-mentioned processing therefrom.

In step S29, if the determination result of step S13 is found not to be a suspend command, then the determination result of step S13 is a terminate command, upon which the procedure goes to step S31. In step S31, under the control of the control block 77, the application engine 82 terminates the active application, if any, identified by App_id. In step S32, under the control of the control block 77, the application engine 82 deletes the data associated with the application identified by App_id from the work memory 83A and deletes the program data of the application from the cache memory 81. Subsequently, the procedure returns to step S11 to repeat the above-mentioned processing therefrom.

Thus, the trigger information handling processing has been described.

According to the trigger information handling processing described above, an application can be started up, an event can be fired, and the application can be terminated in a cooperative association with a television program or a television CM. In addition, if the retention mode is set with switching executed between broadcast content and communication content after event firing, then, when communication content is switched back to broadcast content, the broadcast content can be restarted from the switched point of time.

—Use Cases

The following describes exemplary services that can be realized by use of the above-mentioned techniques according to the present disclosure.

It is assumed that major appliance sale franchise A, a sponsor of a program of X broadcasting station be considering that a television CM to be inserted in the program is arranged so as to introduce eye-catchers for each of the stores near the viewers.

Figure 17:
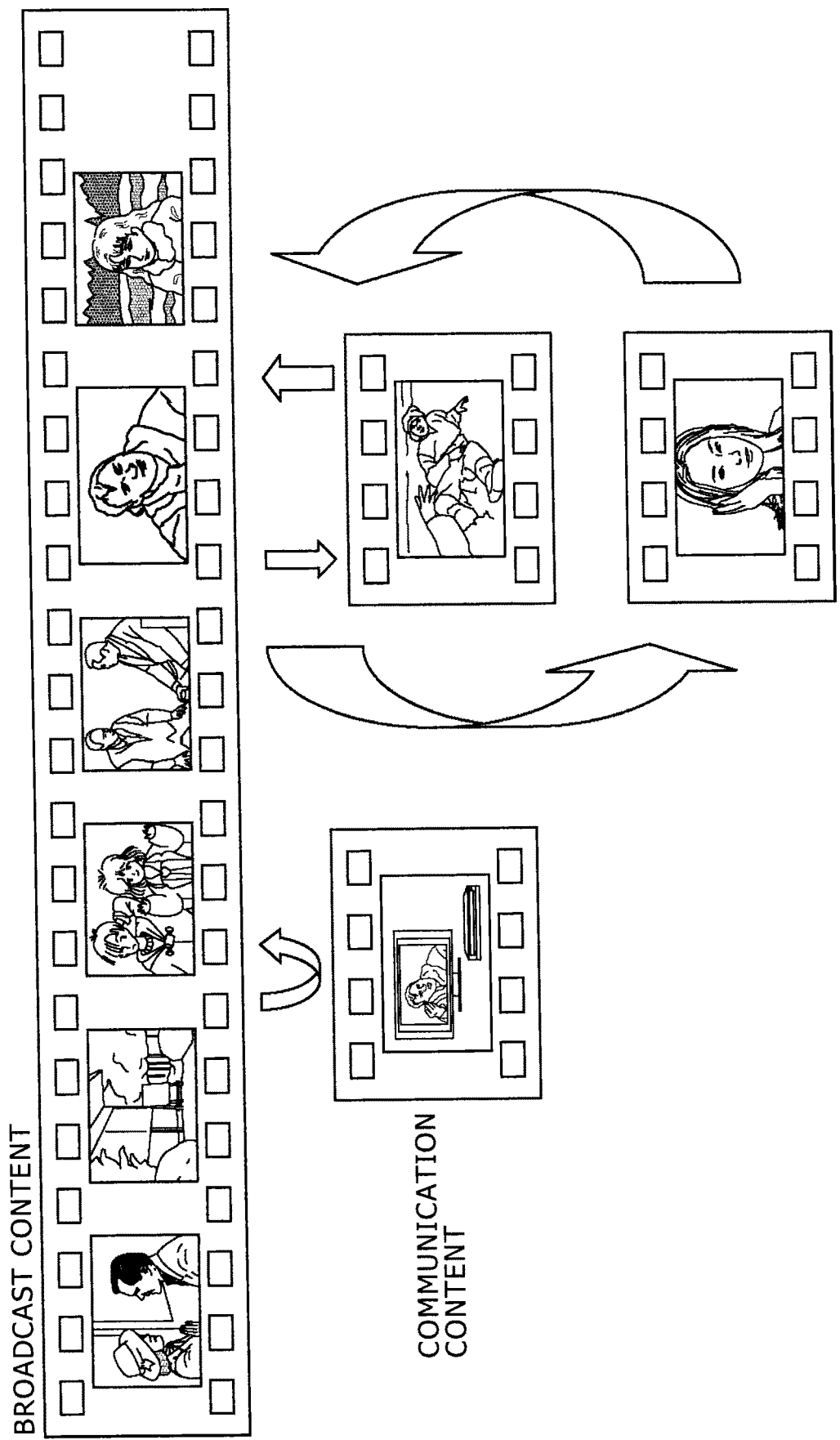
FIG. 17 is a diagram showing an example of a first use case.

Provision of the above-mentioned service can be realized by changing a CM to be inserted in a program to a CM that is suited to the profile of each user. Namely, as shown in FIG. 17, in inserting a CM in a program, this CM can be switched from the video based on broadcast content to the video based on communication content that is streaming-reproduced, thereby providing a CM unique to each user. In addition, the video of a CM can be stored into the storage 84 as NRT content or communication content, thereby switching the video of a CM to the video of the content stored in the storage 84.

Consequently, person A living in P city views the introduction of large-size television receivers and refrigerators that are the best bargains of particular time bargain service at nearby store "a," for example. At the same time, person B living in Q city views the introduction of washing machines and air-conditioners that are special price products of stock disposal of nearby store "b" on the CM of the same program as viewed by person A, for example.

Thus, the above-mentioned technique according to the present disclosure allows the provision of the information that is useful for each individual viewer without being noticed by him or her.

Besides, news to be broadcast in a news program are provided in the form of a complete version (or a long version) or a regular version (or a short version).

Figure 18:
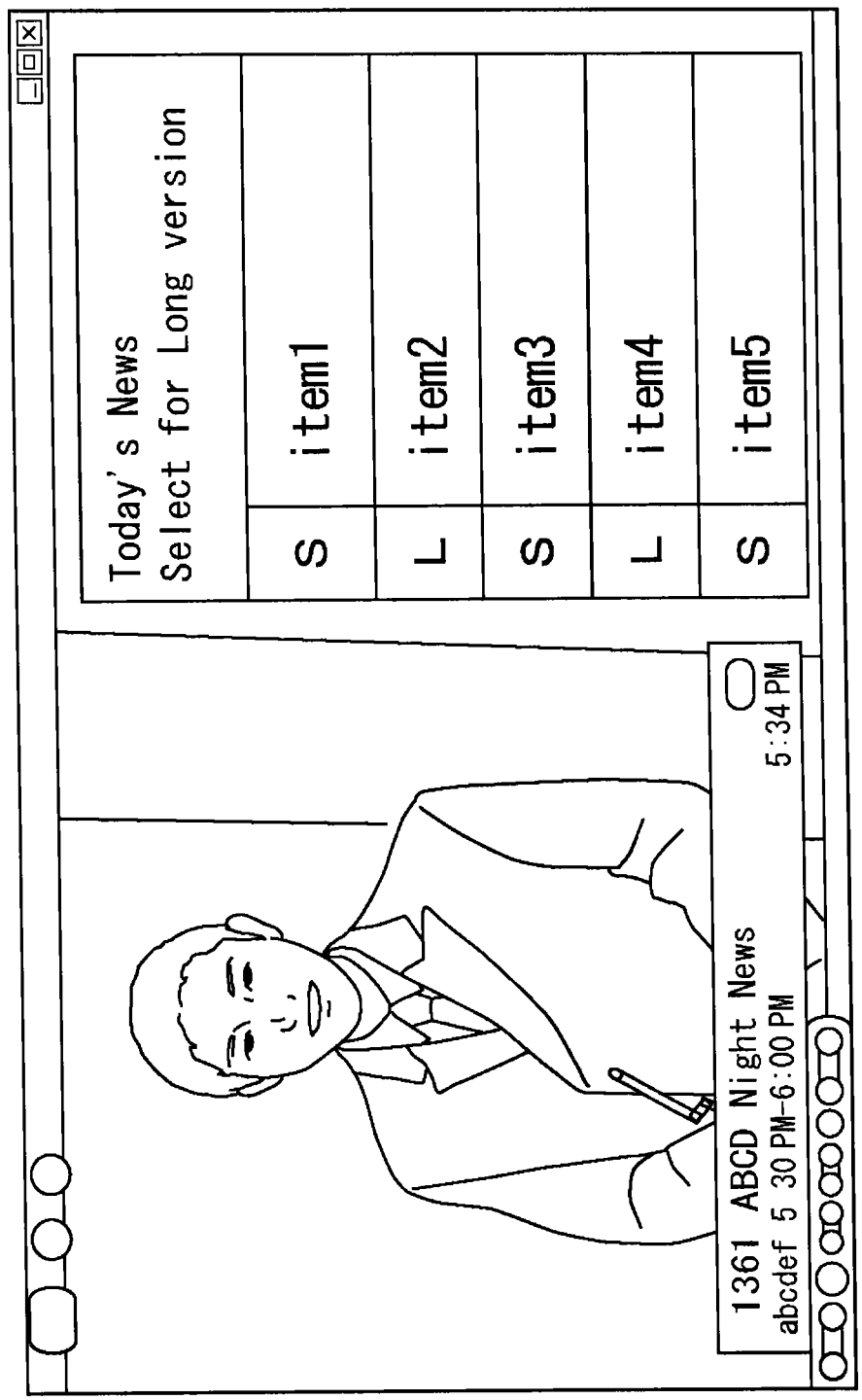
FIG. 18 is a diagram showing an example of a second use case.

As shown in FIG. 18, for example, the morning news of broadcasting station Y displays a screen of a list of news items to be broadcast in advance. When the viewer checks one or more news items that the viewer wants to know, the checked news items are reproduced in the complete version. In the example shown in FIG. 18 for example, of the news items indicated by item1 through item5, item2 and item4 are selected, thereby reproducing these selected items in the complete version. In this case, item2 and item4 to be reproduced in the completion version and item1, item3, and item5 to be reproduced in the regular version are connected to each other as a whole, thereby forming one news program.

In another example, person C did not selected any of the news items, so that all news items are broadcast in the regular version, taking one hour of viewing. After viewing the news program, person C started viewing a drama that was broadcast next. On the other hand, person D selected item 5. Because item5 is reproduced in the complete version, the viewing time of that news program is one hour and 20 minutes. One hour after the viewing of the news program, the drama was displayed on the sub screen, so that person D switched the news program to the drama. Namely, in this case, broadcast content is displayed on the sub screen while communication content is displayed on the main screen, so that if the viewer wants to view broadcast content, the viewer can switch communication content to broadcast content.

As described above, appropriately switching between broadcast content and communication content (inserted content) allows the provision of services of high quality.

—Exemplary Configuration of a Computer

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Referring to FIG. 19, there is shown a block diagram illustrating an exemplary hardware configuration of a computer that is executed by the sequence of processing operations described above.

In the computer 200, a CPU (Central Processing Unit) 201, a ROM (Read Only Memory) 202, and a RAM (Random Access Memory) 203 are interconnected by a bus 204.

The bus 204 is connected to an input/output interface 205. The input/output interface 205 is connected to an input block 206 made up of a keyboard, a mouse, and a microphone, for example, an output block 207 made up of a monitor display and a loudspeaker, for example, a storage block 208 made up of a hard disk drive or a nonvolatile memory, for example, a communication block 209 made up of a network interface for example, and a drive 210 for driving a removable media 111, such as a magnetic disk, an optical disk, a magneto-optical disk, or a semiconductor memory.

In the computer configured as described above, the CPU 201 loads programs from the storage block 208 into the RAM 203 via the input/output interface 205 and the bus 204 and executes loaded programs, thereby executing the above-mentioned sequence of processing.

It should be noted that the programs to be executed by the computer may be executed in a time-dependent manner in the sequences described herein or in parallel or on an on-demand basis.

It should also be noted that programs may be processed by one unit of computer or by two or more units of computers in a distributed manner. Further, programs may be transmitted to a remote computer to be executed.

It should also be noted that term "system" as used herein denotes an entire apparatus configured by a plurality of component units.

While preferred embodiments of the present disclosure have been described using specific terms, such description is for illustrative purpose only, and it is to be understood that changes and variations may be made without departing from the spirit or scope of the following claims.

Further, the technique according to the present disclosure may have the following configurations.

(1)

A reception apparatus including:

a reception block configured to receive broadcast content broadcast via a broadcasting network;

an acquisition block configured to acquire inserted content that is inserted in the broadcast content during the reception thereof;

an output block configured to output at least one of the broadcast content and the inserted content;

a switch block configured to switch between the broadcast content and the inserted content outputted from the output block; and a buffer configured to sequentially store data of the received broadcast content when the broadcast content is switched to the inserted content;

wherein, if the inserted content is switched to the broadcast content, the output block outputs the broadcast content from the buffer while the inserted content is outputted.

(2)

The reception apparatus according to (1) further including:

a trigger extraction block configured to extract trigger information associated with control of an application program to be executed in cooperative association with the broadcast content, the trigger information being transmitted with the received broadcast content;

wherein the acquisition block acquires the inserted content on the basis of the extracted trigger information.

(3)

The reception apparatus according to (1) or (2), wherein, if the inserted content has been terminated, the switch block switches the inserted content to the broadcast content.

(4)

The reception apparatus according to any one of (1) through (3), wherein, if the inserted content has been switched to the broadcast content, the output block outputs the received broadcast content.

(5)

The reception apparatus according to any one of (1) through (4), wherein the inserted content is communication content that is acquired via a communication network and reproduced in a streaming manner.

(6)

The reception apparatus according to any one of (1) through (5), wherein the inserted content is acquired via the broadcasting network in NRT (Non Real Time) broadcasting and stored.

(7)

The reception apparatus according to any one of (1) through (6), wherein the inserted content is communication content that is acquired via a communication network and reproduced in a download manner.

(8)

The reception apparatus according to any one of (2) through (7), wherein the trigger information includes at least one of an acquire command also called a register command, a startup command, an event fire command, a suspend command, and a terminate command for a predetermined application program.

(9)

A reception method including the steps of causing a reception apparatus to:

receive broadcast content broadcast via a broadcasting network;

acquire inserted content that is inserted in the broadcast content during the reception thereof;

output at least one of the broadcast content and the inserted content;

switch between the broadcast content and the inserted content outputted from the output block; and store sequentially data of the received broadcast content when the broadcast content is switched from the inserted content;

wherein, if the inserted content is switched to the broadcast content, the broadcast content is outputted from the buffer while the inserted content is outputted.

(10)

A computer program for causing a computer of a reception apparatus to execute the steps of:

receiving broadcast content broadcast via a broadcasting network;

acquiring inserted content that is inserted in the broadcast content during the reception thereof;

outputting at least one of the broadcast content and the inserted content;

switching between the broadcast content and the inserted content outputted from the output block; and storing sequentially data of the received broadcast content when the broadcast content is switched to the inserted content;

wherein, if the inserted content is switched to the broadcast content, the broadcast content is outputted from the buffer while the inserted content is outputted.

What is claimed is:

1. A reception apparatus comprising:
   circuitry configured to
   receive broadcast content broadcast via a broadcast signal,
   acquire inserted content that is inserted into the broadcast content,
   output the broadcast content,
   switch output from the broadcast content to the inserted content based on a trigger information within the broadcast signal, the trigger information being associated with a trigger,
   store data of the received broadcast content in a buffer when the output is switched from the broadcast content to the inserted content, and
   switch back output from the inserted content to the broadcast content starting from the broadcast content stored in the buffer while the inserted content is being output,
   wherein the trigger is one of a plurality of triggers together prompting the switch of output from the broadcast content to the inserted content, and
   wherein the trigger information includes a type of application function and at least one of an acquire command, a register command, a startup command, an event fire command, a suspend command, and a terminate command for an application program.

2. The reception apparatus according to claim 1, wherein the circuitry is further configured to extract the trigger information associated with control of an application program to be executed in cooperative association with the broadcast content, and
   wherein the circuitry is configured to acquire the inserted content on the basis of the extracted trigger information.

3. The reception apparatus according to claim 1, wherein the inserted content is communication content that is acquired via a communication network and reproduced in a streaming manner.

4. The reception apparatus according to claim 1, wherein the inserted content is acquired via the broadcasting network in NRT (Non Real Time) broadcasting and stored.

5. The reception apparatus according to claim 1, wherein the inserted content is communication content that is acquired via a communication network and reproduced in a download manner.

6. A reception method implemented by a reception apparatus comprising:
   receiving broadcast content broadcast via a broadcast signal;
   acquiring inserted content that is inserted into the broadcast content;
   outputting the broadcast content;
   switching output from the broadcast content to the inserted content based on a trigger information within the broadcast signal, the trigger information being associated with a trigger;
   storing data of the received broadcast content in a buffer when the output is switched from the broadcast content to the inserted content; and
   switching back output from the inserted content to the broadcast content starting from the broadcast content stored in the buffer while the inserted content is being output,
   wherein the trigger is one of a plurality of triggers together prompting the switch of output from the broadcast content to the inserted content, and
   wherein the trigger information includes a type of application function and at least one of an acquire command, a register command, a startup command, an event fire command, a suspend command, and a terminate command for an application program.

7. The method according to claim 6, further comprising:
   extracting the trigger information associated with control of an application program to be executed in cooperative association with the broadcast content; and
   acquiring the inserted content on the basis of the extracted trigger information.

8. The method according to claim 6, further comprising:
   acquiring inserted content that is communication content via a communication network; and
   reproducing the inserted content in a streaming manner.

9. The method according to claim 6, further comprising:
   acquiring inserted content via the broadcasting network in NRT (Non Real Time) broadcasting; and
   storing the inserted content.

10. The method according to claim 6, further comprising:
    acquiring inserted content that is communication content via a communication network; and
    reproducing the inserted content in a download manner.

11. A non-transitory computer readable medium storing a computer program that when executed by a computer of a reception apparatus causes the computer to execute a method comprising:
    receiving broadcast content broadcast via a broadcast signal;
    acquiring inserted content that is inserted into the broadcast content;
    outputting the broadcast content;
    switching output from the broadcast content to the inserted content based on a trigger information within the broadcast signal. the trigger information being associated with a trigger;
    storing data of the received broadcast content in a buffer when the output is switched from the broadcast content to the inserted content; and
    switching back the output from the inserted content to the broadcast content starting from the broadcast content stored in the buffer while the inserted content is being output,
    wherein the trigger is one of a plurality of triggers together prompting the switch of output from the broadcast content to the inserted content, and
    wherein the trigger information includes a type of application function and at least one of an acquire command, a register command, a startup command, an event fire command, a suspend command, and a terminate command for an application program.

12. A transmission apparatus comprising:
    circuitry configured to
    insert a trigger information in a broadcast signal, the trigger information being associated with a trigger, and
    transmit broadcast content broadcast via the broadcast signal,
    wherein the trigger initiates a switch of output of the broadcast content to output of inserted content that is inserted into the broadcast content,
    wherein data of the broadcast content is stored in a buffer when the output of the broadcast content is switched to output of inserted content,
    wherein the output from the inserted content to the broadcast content starting from the broadcast content stored in the buffer while the inserted content is being output, wherein the trigger is one of a plurality of triggers together prompting the switch of output from the broadcast content to the inserted content, and wherein the trigger information includes a type of application function and at least one of an acquire command, a register command, a startup command, an event fire command, a suspend command, and a terminate command for an application program.

13. A television receiver, comprising:
the reception apparatus according to claim 1.

14. A transmission method comprising:
inserting a trigger information in a broadcast signal, the trigger infmmation being associated with a trigger; and
transmitting broadcast content broadcast via the broadcast signal,
wherein the trigger initiates a switch of output of the broadcast content to output of inserted content that is inserted into the broadcast content,
wherein data of the broadcast content is stored in a buffer when the output of the broadcast content is switched to output of inserted content,
wherein the output from the inserted content to the broadcast content starting from the broadcast content stored in the buffer while the inserted content is being output,
wherein the trigger is one of a plurality of triggers together prompting the switch of output from the broadcast content to the inserted content, and
wherein the trigger information includes a type of application function and at least one of an acquire command, a register command, a startup command, an event fire command, a suspend command, and a terminate command for an application program.

15. The reception apparatus according to claim 1, wherein circuitry is further configured to
extract trigger information relating to control over an application program to be executed in response to the broadcast content, the trigger information being transmitted together with the received broadcast content,
acquire the insertion content based on the extracted trigger information, and
switch between the broadcast content and insertion content in two modes including a pass-through mode and a retention mode, in the pass-through mode, when switching back from the insertion content to the broadcast content, the output section outputs the broadcast content being received at that point in time, while in the retention mode, when switching back from the insertion content to the broadcast content, the output section outputs the broadcast content stored in the buffer while the insertion content is output.

16. The method according to claim 6, further comprising:
extracting trigger information relating to control over an application program to be executed in response to the broadcast content, the trigger information being transmitted together with the received broadcast content,
acquiring the insertion content based on the extracted trigger information, and
switching between the broadcast content and insertion content in two modes including a pass-through mode and a retention mode, in the pass-through mode, when switching back from the insertion content to the broadcast content, the output section outputs the broadcast content being received at that point in time, while in the retention mode, when switching back from the insertion content to the broadcast content, the output section outputs the broadcast content stored in the buffer while the insertion content is output.

17. The television receiver according to claim 13, wherein the circuitry is further configured to extract the trigger information associated with control of an application program to be executed in cooperative association with the broadcast content, and
wherein the circuitry is configured to acquire the inserted content on the basis of the extracted trigger information.

18. The television receiver according to claim 13, wherein the inserted content is communication content that is acquired via a communication network and reproduced in a streaming manner.

19. The television receiver according to claim 13, wherein the inserted content is acquired via the broadcasting network in NRT (Non Real Time) broadcasting and stored.

20. The television receiver according to claim 13, wherein the inserted content is communication content that is acquired via a communication network and reproduced in a download manner.

21. The reception apparatus according to claim 1, wherein the trigger information includes the type of application function and at least three of the acquire command, the register command, the startup command, the event fire command, the suspend command, and the terminate command for the application program.

* * * * *